United States Patent
Hong et al.

(10) Patent No.: US 12,160,644 B2
(45) Date of Patent: Dec. 3, 2024

(54) VIDEO INTERACTION METHOD AND APPARATUS, ELECTRONIC DEVICE, AND COMPUTER-READABLE STORAGE MEDIUM

(71) Applicant: TENCENT TECHNOLOGY (SHENZHEN) COMPANY LIMITED, Shenzhen (CN)

(72) Inventors: Wei Hong, Shenzhen (CN); Ke Yang, Shenzhen (CN); Deyi Yu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/964,751

(22) Filed: Oct. 12, 2022

(65) Prior Publication Data

US 2023/0029698 A1 Feb. 2, 2023

Related U.S. Application Data

(63) Continuation of application No. PCT/CN2021/100264, filed on Jun. 16, 2021.

(30) Foreign Application Priority Data

Jul. 23, 2020 (CN) .......................... 202010719601.3

(51) Int. Cl.
H04N 21/8541 (2011.01)
(52) U.S. Cl.
CPC .............................. *H04N 21/8541* (2013.01)

(58) Field of Classification Search
CPC .................................................. H04N 21/8541
See application file for complete search history.

(56) References Cited

U.S. PATENT DOCUMENTS

2006/0064733 A1* 3/2006 Norton ............. H04N 21/42646
725/135
2009/0276805 A1* 11/2009 Andrews, II ......... H04N 21/435
725/38

(Continued)

FOREIGN PATENT DOCUMENTS

| CN | 105681831 A | 6/2016 |
| CN | 110719530 A | 1/2020 |

(Continued)

OTHER PUBLICATIONS

The World Intellectual Property Organization (WIPO) International Search Report for PCT/CN2021/100264 Sep. 15, 2021 8 Pages (including translation).

*Primary Examiner* — Nicholas T Corbo
(74) *Attorney, Agent, or Firm* — ANOVALAW GROUP PLLC

(57) ABSTRACT

A video interaction method includes: displaying an interactive video playing page playing a target interactive video; playing a first target object in the target interactive video in the interactive video playing page, and displaying a first interaction component in a first region associated with the first target object; determining, in response to a first operation on the first interaction component, a first sub-variable value of a first sub-variable corresponding to the first interaction component; and playing a target media segment of the target interactive video in the interactive video playing page according to the first sub-variable value.

14 Claims, 19 Drawing Sheets

(56) References Cited

U.S. PATENT DOCUMENTS

| | | | | |
|---|---|---|---|---|
| 2014/0380167 | A1* | 12/2014 | Bloch | H04N 21/47205 715/723 |
| 2018/0160199 | A1* | 6/2018 | Kring | H04N 21/4758 |
| 2019/0373330 | A1* | 12/2019 | Bloch | H04N 21/4532 |
| 2019/0388789 | A1 | 12/2019 | Aghdaie et al. | |
| 2020/0112772 | A1* | 4/2020 | Kingori | H04N 21/8541 |

FOREIGN PATENT DOCUMENTS

| | | |
|---|---|---|
| CN | 110784752 A | 2/2020 |
| CN | 111031379 A | 4/2020 |
| CN | 111741367 A | 10/2020 |

\* cited by examiner

VIDEO INTERACTION METHOD AND APPARATUS, ELECTRONIC DEVICE, AND COMPUTER-READABLE STORAGE MEDIUM

CROSS-REFERENCES TO RELATED APPLICATIONS

This application is a continuation application of PCT Patent Application No. PCT/CN2021/100264, entitled "METHOD AND DEVICE FOR VIDEO INTERACTION, ELECTRONIC DEVICE, AND COMPUTER-READABLE STORAGE MEDIUM" and filed on Jun. 16, 2021, which claims priority to Chinese Patent Application No. 202010719601.3, entitled "VIDEO INTERACTION METHOD AND APPARATUS, ELECTRONIC DEVICE, AND COMPUTER-READABLE STORAGE MEDIUM" and filed with the China National Intellectual Property Administration on Jul. 23, 2020, the entire contents of both of which are incorporated herein by reference.

FIELD OF THE TECHNOLOGY

The present disclosure relates to the field of computer technologies, and specifically, to a video interaction method and apparatus, an electronic device, and a computer-readable storage medium.

BACKGROUND OF THE DISCLOSURE

In some interactive video, the overall interaction includes a single option component and a storyline component. As a result, the interactivity of the interactive video is relatively monotonous.

Therefore, there is a need to provide a new video interaction method and apparatus, an electronic device, and a computer-readable storage medium.

Information disclosed in the above background part is used only for enhancing the understanding of the background of the present disclosure, and therefore may include information that does not constitute the related art known to a person of ordinary skill in the art.

SUMMARY

Embodiments of the present disclosure provide a video interaction method and apparatus, an electronic device, and a computer-readable storage medium.

Other features and advantages of the present disclosure become obvious through the following detailed descriptions, or may be partially learned through the practice of the present disclosure.

A video interaction method is provided, including: displaying an interactive video playing page playing a target interactive video; playing a first target object in the target interactive video in the interactive video playing page, and displaying a first interaction component in a first region associated with the first target object; determining, in response to a first operation on the first interaction component, a first sub-variable value of a first sub-variable corresponding to the first interaction component; and playing a target media segment of the target interactive video in the interactive video playing page according to the first sub-variable value.

A video interaction apparatus is provided, including: a playing page display module, configured to display an interactive video playing page playing a target interactive video; an interaction component display module, configured to play a first target object in the target interactive video in the interactive video playing page, and display a first interaction component in a first region associated with the first target object; a first variable determining module, configured to determine, in response to a first operation on the first interaction component, a first sub-variable value of a first sub-variable corresponding to the first interaction component; and a target media playing module, configured to play a target media segment of the target interactive video in the interactive video playing page according to the first sub-variable value.

A video interaction method is provided, including: displaying an interactive video creation page, the interactive video creation page being used for creating components and media segments in an interactive video; creating a first sub-variable in response to a first variable setting instruction; creating a first interaction component in a first region associated with a first target object in a target interactive video in response to a first interaction component setting instruction; determining a first sub-variable corresponding to the first interaction component and a value changing amount of the first sub-variable according to the first interaction component setting instruction; and creating a target media segment and a determining condition set corresponding to the target media segment in response to a target media segment setting instruction, the determining condition set corresponding to the target media segment including a determining condition corresponding to the first sub-variable, the target media segment being played based on a first sub-variable value of the first sub-variable and the determining condition set corresponding to the target media segment, and the first sub-variable value being determined based on a first operation acting on the first interaction component.

A video interaction apparatus is provided, including: a creation page display module, configured to display an interactive video creation page, the interactive video creation page being used for creating components and media segments in an interactive video; a first variable creating module, configured to create a first sub-variable in response to a first variable setting instruction; an interaction component creating module, configured to create a first interaction component in a first region associated with a first target object in a target interactive video in response to a first interaction component setting instruction; a first variable value setting module, configured to determine a first sub-variable corresponding to the first interaction component and a value changing amount of the first sub-variable according to the first interaction component setting instruction; and a target media creating module, configured to create a target media segment and a determining condition set corresponding to the target media segment in response to a target media segment setting instruction, the determining condition set corresponding to the target media segment including a determining condition corresponding to the first sub-variable, the target media segment being played based on a first sub-variable value of the first sub-variable and the determining condition set corresponding to the target media segment, and the first sub-variable value being determined based on a first operation acting on the first interaction component.

A computer device is provided, including a memory and one or more processors, the memory storing computer-readable instructions, the computer-readable instructions, when executed by the one or more processors, causing the one or more processors to perform the operations of the video interaction method.

One or more non-transitory computer-readable storage media storing computer-readable instructions are provided, the computer-readable instructions, when executed by one or more processors, causing the one or more processors to perform the operations of the video interaction method.

A computer program product or a computer program is provided, the computer program product or the computer program including computer-readable instructions, the computer-readable instructions being stored in a computer-readable storage medium, a processor of a computer device reading the computer-readable instructions from the computer-readable storage medium, and the processor executing the computer-readable instructions to cause the computer device to perform the operations of the video interaction method.

It is to be understood that, the foregoing general descriptions and the following detailed descriptions are merely for illustration and explanation purposes and are not intended to limit the present disclosure.

BRIEF DESCRIPTION OF THE DRAWINGS

To describe the technical solutions in the embodiments of the present disclosure more clearly, the following briefly describes accompanying drawings required for describing the embodiments. Apparently, the accompanying drawings in the following descriptions show merely some embodiments of the present disclosure, and a person skilled in the art may still derive other accompanying drawings from these accompanying drawings without creative efforts.

DESCRIPTION OF EMBODIMENTS

Figure 1:
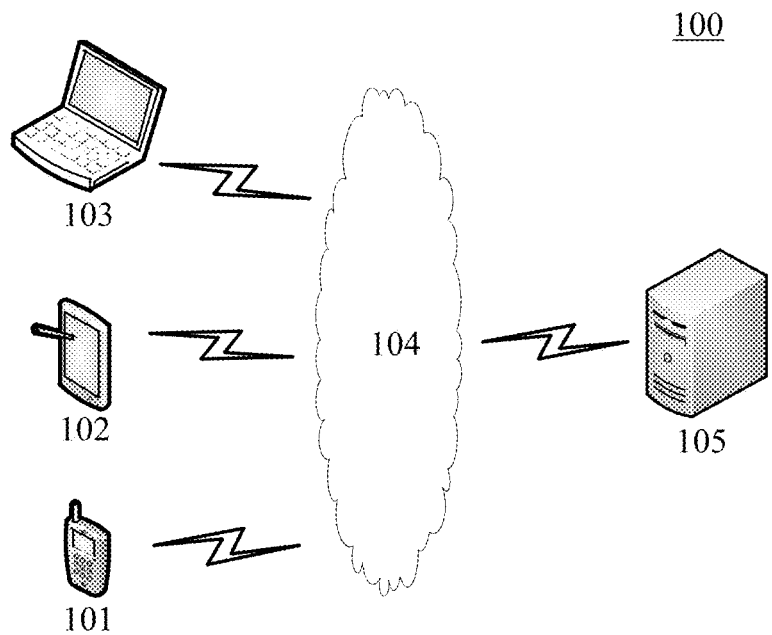
FIG. 1 is a schematic diagram of an exemplary system architecture to which a video interaction method or a video interaction apparatus according to an embodiment of the present disclosure may be applicable.

Exemplary implementations are now described more comprehensively with reference to the accompanying drawings. However, the exemplary implementations may be implemented in various forms, and it is not to be understood as being limited to the examples described herein. Conversely, the implementations are provided to make the present disclosure more comprehensive and complete, and comprehensively convey the idea of the exemplary implementations to a person skilled in the art.

In addition, the described features, structures, or characteristics may be combined in one or more embodiments in any appropriate manner. In the following descriptions, a lot of specific details are provided to give a comprehensive understanding of the embodiments of the present disclosure. However, a person skilled in the art is to be aware that, the technical solutions in the present disclosure may be implemented without one or more of the particular details, or another method, unit, apparatus, or step may be used. In other cases, well-known methods, apparatuses, implementations, or operations are not shown or described in detail, to avoid obscuring the aspects of the present disclosure.

The block diagrams shown in the accompanying drawings are merely functional entities and do not necessarily correspond to physically independent entities. That is, the functional entities may be implemented in a software form, or in one hardware module or integrated circuit, or in different networks and/or processor apparatuses and/or microcontroller apparatuses.

The flowcharts shown in the accompanying drawings are merely examples for descriptions, do not necessarily include all content and operations/steps, and do not necessarily be performed in the described sequences either. For example, some operations/steps may be further divided, while some operations/steps may be combined or partially combined. Therefore, an actual execution sequence may change according to an actual case.

In the related art, a non-linear video includes a plurality of related video segments, and the plurality of video segments are arranged according to a non-linear connection sequence. For example, the plurality of video segments may be arranged according to a connection sequence of nodes of a multi-way tree.

An interactive video is a content interaction video service that uses content of a "non-linear video" as a main story and supports time domain interaction, spatial domain interaction, and event-type interaction developed on the content of the "non-linear video". The service has interaction capabilities such as branching story selection, viewing angle switching, and picture interaction, which can provide a user with interactive watching experience having strong sense of participation and strong sense of immersion. The interactive video includes content of a plurality of subject types, for example, interactive movies and television dramas, interactive advertisements, and interactive animations. The time domain interaction refers to changes of a plurality of video segments in a non-linear video in a time dimension. The spatial domain interaction refers to changes of a plurality of video segments in a non-linear video in a space dimension. The event-type interaction refers to changes of a plurality of video segments in a non-linear video in an event dimension.

In the related art, the interactive video is merely content of simple AB options and includes a single story form, which cannot be compatible with a complex game system setting. For example, the function design of a first type of interactive videos merely includes two parts: an interactive option component and a story line component. The interactive option component includes interruptive or non-interruptive option components appeared in a story, and different branch lines are entered in response to operations on different components. A standard for determining an interruptive or non-interruptive option component lies in that whether a current operation of the user is interrupted. After an entrance of the story line component is clicked, story lines are displayed, and an existing current may be returned by clicking node returning.

The function design of a second type of interactive videos also includes two functions similar to that of the first types of interactive videos: an interactive option component and a progress backtrack component. The interactive option component is similar to that of the first type of interactive videos and is configured to edit a story and text of a branch option. The progress backtrack component never display the story line, each video cover represents a video node, and a selected state of a video represents a video that is currently watched.

However, the two types of interactive videos are both formed by a single option component and a story line component, which cannot enlarge an interactive entertainment function of the interactive video.

FIG. 1 is a schematic diagram of an exemplary system architecture to which a video interaction method or a video interaction apparatus according to an embodiment of the present disclosure may be applicable.

As shown in FIG. 1, the system architecture 100 may include one or more of terminal devices 101, 102, and 103, a network 104, and a server 105. The network 104 is a medium configured to provide communication links between the terminal devices 101, 102, and 103, and the server 105. The network 104 may include various connection types, for example, a wired or wireless communication link, or an optical fiber cable.

It is to be understood that the number of terminal devices, the number of networks, and the number of servers in FIG. 1 are merely illustrative. There may be any number of terminal devices, any number of networks, and any number of servers according to an implementation requirement. For example, the server 105 may be a single server, a server cluster including a plurality of servers, or a cloud server.

A user may interact with the server 105 through the network 104 by using the terminal devices 101, 102, and 103, to receive or send messages. The terminal devices 101, 102, and 103 may be various electronic devices with a display screen and support web browsing, including, but not limited to, smartphones, tablet computers, portable computers, desktop computers, wearable devices, virtual reality devices, smart televisions, and smart homes. For example, the terminal device 101 (or may be the terminal device 102 or 103) displays an interactive video playing page playing a target interactive video, plays a first target object in the target interactive video in the interactive video playing page, and displays a first interaction component in a first region associated with the first target object. The terminal device 101 may receive a first operation acted by the user on the first interaction component and sends the first operation to the server.

The server 105 may be a server providing various services. For example, the server 105 may determine, in response to the first operation on the first interaction component, a first sub-variable value of a first sub-variable corresponding to the first interaction component. The server 105 may feedback the first sub-variable value to the terminal device 101. The terminal device 101 may play a target media segment of the target interactive video in the interactive video playing page according to the first sub-variable value. Therefore, when the target interactive video is played, the first interaction component is displayed in the first associated region when the first target object is played, and the first sub-variable value of the first sub-variable is determined based on the first operation on the first interaction component, so that the first operation and the first sub-variable can be associated. The first sub-variable value of the first sub-variable is used as a determining condition, so that the target media segment in the interactive video can be interacted and played in response to the first operation, thereby enriching the interactivity and interactive content of the target interactive video.

In this way, when the target interactive video is played, the first interaction component is displayed in the first associated region when the first target object is played, and the first sub-variable value of the first sub-variable is determined based on the first operation on the first interaction component, so that the first operation and the first sub-variable can be associated. On one hand, the first sub-variable value of the first sub-variable is used as a determining condition, so that the target media segment in the interactive video can be interacted and played in response to the first operation, thereby enriching the interactivity and interactive content of the target interactive video. On the other hand, playing of the target media segment may be quickly triggered through the first operation on the first interaction component in the first region associated with the first target object, so that a response speed of a computer can be improved, the communication efficiency with the computer can be improved, and unnecessary resource wastes can be avoided.

In another example, the terminal device 101 (or may be the terminal device 102 or 103) may display an interactive video creation page, receive a first variable setting instruction, a first interaction component setting instruction, and a target media segment setting instruction, and send the instructions to the server 105. The server 105 may create a first sub-variable in response to the first variable setting instruction, create a first interaction component in a first region associated with a first target object in a target interactive video in response to the first interaction component setting instruction, determine a first sub-variable corresponding to the first interaction component and a value changing amount of the first sub-variable according to the first interaction component setting instruction, and create a target media segment and a determining condition set corresponding to the target media segment in response to the target media segment setting instruction. The determining condition set corresponding to the target media segment includes a determining condition corresponding to the first sub-variable, the target media segment is played based on a first sub-variable value of the first sub-variable and the determining condition set corresponding to the target media segment, and the first sub-variable value is determined based on a first operation acting on the first interaction component. The server 105 sends feedback information of the first variable setting instruction, the first interaction component setting instruction, and the target media segment setting instruction to the terminal device 101 (or may be the terminal device 102 or 103). In this way, association among the first interaction component and the first sub-variable may be established based on interaction between the terminal device 101 (102 or 103) and the server 105, and a target interactive video including the first interaction component and the target media segment may be generated.

In this way, the first variable setting instruction, the first interaction component setting instruction, and the target media segment setting instruction are responded, so that association among the first sub-variable, the first target object, the first associated region, the first interaction component, and the target media segment may be implemented. On one hand, the generated interactive video can trigger interaction and playing of the target media segment by responding to the first operation on the first associated region, to enrich the interactivity and interactive content of the target interactive video. On the other hand, playing of the target media segment may be quickly triggered through the first operation on the first interaction component in the first region associated with the first target object, so that a response speed of a computer can be improved, the communication efficiency with the computer can be improved, and unnecessary resource wastes can be avoided.

Figure 2:
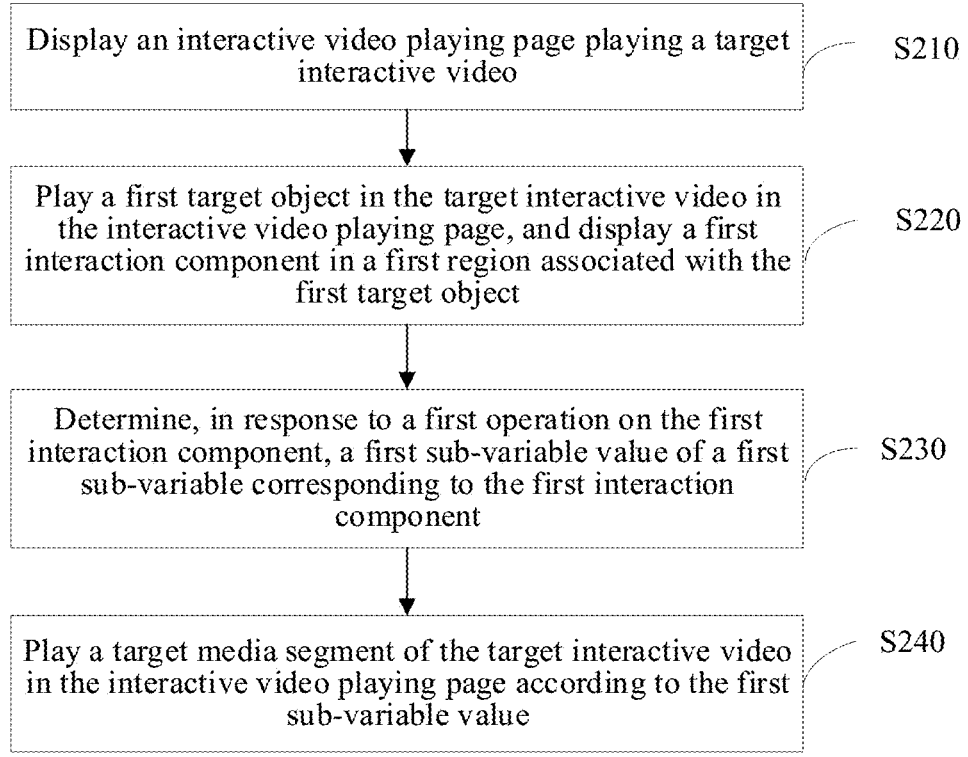
FIG. 2 is a schematic flowchart of a video interaction method according to an embodiment of the present disclosure.

FIG. 2 is a flowchart of a video interaction method according to an embodiment. The method provided in this embodiment of the present disclosure may be processed by any electronic device having a computing processing capability, such as the server or the terminal device in the embodiment of FIG. 1. A description is made by using an example in which a terminal device is an execution entity in the following embodiments, and the present disclosure is not limited thereto.

As shown in FIG. 2, the video interaction method provided in this embodiment of the present disclosure may include the following steps:

Step S210: Display an interactive video playing page playing a target interactive video.

In this embodiment of the present disclosure, the target interactive video includes a plurality of related video segments, and the plurality of video segments are arranged according to a non-linear connection sequence. The interactive video playing page may include a main interactive video playing page and a component entrance. The component entrance may be used for clicking and viewing a resident component. The resident component is a preset global component displayed in the interactive video playing page.

Step S220: Play a first target object in the target interactive video in the interactive video playing page, and display a first interaction component in a first region associated with the first target object.

In this embodiment of the present disclosure, the first target object may be a video element in the target interactive video. The first region associated with the first target object may be a specific position of the first target object in the target interactive video, such as a frame image of the target interactive video and a pixel coordinate range in which the first target object is located in the frame image. In this embodiment, the first interaction component is displayed in the first associated region when the first target object is played, so that the first target object and the first interaction component can be associated.

Step S230: Determine, in response to a first operation on the first interaction component, a first sub-variable value of a first sub-variable corresponding to the first interaction component.

In this embodiment of the present disclosure, the first operation may be, for example, a click operation, a double click operation, or a slide operation, and the technical solutions of the present disclosure are not limited thereto. The first interaction component is an interaction component, and the interaction component is simple encapsulation of data and methods. By using a component, drag and drop programming, quick attribute processing, and real object-oriented design may be implemented. The interaction component may include a button, a check box, a slider, and a scrollbar. The interaction component is invisible in a playing page of the target interactive video, but a visible component exist in the interaction component. The first interaction component may correspond to at least one first sub-variable, which is not specifically limited in the technical solutions of the present disclosure.

Step S240: Play a target media segment of the target interactive video in the interactive video playing page according to the first sub-variable value.

In this embodiment of the present disclosure, the target media segment may be, for example, a video segment or a picture, which is not specifically limited in the technical solutions of the present disclosure. A target determining condition of the target media segment may be obtained, and the first sub-variable value is determined according to the target determining condition. When the first sub-variable value meets the target determining condition, the target media segment of the target interactive video is played in the interactive video playing page. The target determining condition of the target media segment may include a target condition threshold, and the first sub-variable value meeting the target determining condition may be that, for example, the first sub-variable value is greater than or equal to the target condition threshold. Alternatively, the first sub-variable value meeting the target determining condition may be that, for example, the first sub-variable value is less than or equal to the target condition threshold. This is not specifically limited in the technical solutions of the present disclosure.

According to the video interaction method provided in the implementations of the present disclosure, when the target interactive video is played, the first interaction component is displayed in the first associated region when the first target object is played, and the first sub-variable value of the first sub-variable is determined based on the first operation on the first interaction component, so that the first operation and the first sub-variable can be associated. The first sub-variable value of the first sub-variable is used as a determining condition, so that the target media segment in the interactive video can be interacted and played in response to the first operation, thereby enriching the interactivity and interactive content of the target interactive video. Playing of the target media segment may be quickly triggered through the first operation on the first interaction component in the first region associated with the first target object, so that a response speed of a computer can be improved, the communication efficiency with the computer can be improved, and unnecessary resource wastes can be avoided.

In an exemplary embodiment, in step S230, a value changing amount of the first sub-variable and a current variable value of the first sub-variable may be obtained based on the first operation; and the first sub-variable value may be determined according to the value changing amount of the first sub-variable and the current variable value of the first sub-variable. The value changing amount and the current variable value of the first sub-variable may be added to determine the first sub-variable value. For example, if the current variable value is 0 and the value changing amount is +10, the first sub-variable value may be 0+(+10)=10.

Figure 3:
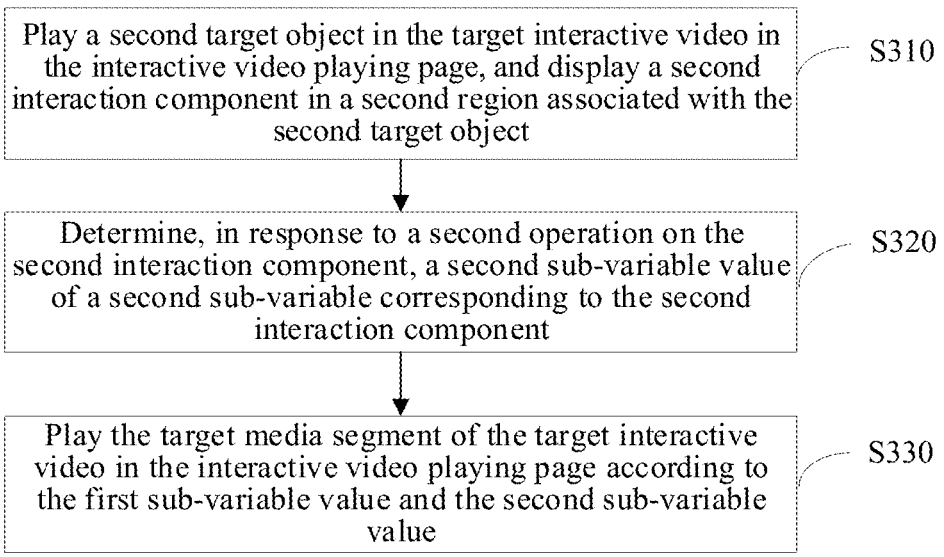
FIG. 3 is a flowchart based on step S240 of FIG. 2 in an exemplary embodiment.

FIG. 3 is a flowchart based on step S240 of FIG. 2 in an exemplary embodiment.

As shown in FIG. 3, step S240 in the embodiment of FIG. 2 may further include the following steps:

S310: Play a second target object in the target interactive video in the interactive video playing page, and display a second interaction component in a second region associated with the second target object.

In this embodiment of the present disclosure, the second target object may be a video element in the target interactive video. The second region associated with the second target object may be a specific occurrence position of the second target object in the target interactive video. In this embodiment, the second interaction component is displayed in the second associated region when the second target object is played, so that the second target object and the second interaction component can be associated.

Step S320: Determine, in response to a second operation on the second interaction component, a second sub-variable value of a second sub-variable corresponding to the second interaction component.

In this embodiment of the present disclosure, the second operation is similar to the first operation, and may also be, but not limited to, a click operation, a double click operation, or a slide operation.

Step S330: Play the target media segment of the target interactive video in the interactive video playing page according to the first sub-variable value and the second sub-variable value.

In this embodiment of the present disclosure, a target determining condition of the target media segment may be obtained, and the first sub-variable value and the second sub-variable value are determined according to the target determining condition. When the first sub-variable value and the second sub-variable value meet the target determining condition, the target media segment of the target interactive video is played in the interactive video playing page. The target determining condition of the target media segment may include a target condition threshold, the target condition threshold may include a first condition threshold and a second condition threshold, and the first sub-variable value and the second sub-variable value meeting the target determining condition may be that, but not limited to that, the first sub-variable value is greater than or equal to the first condition threshold and the second sub-variable value is greater than or equal to the second condition threshold.

In this embodiment, the first sub-variable value of the first sub-variable and the second sub-variable value of the second variable are used as a determining condition, so that the target media segment in the interactive video can be interacted and played in response to the first operation or the second operation, thereby enriching the interactivity and interactive content of the target interactive video.

Figure 4:
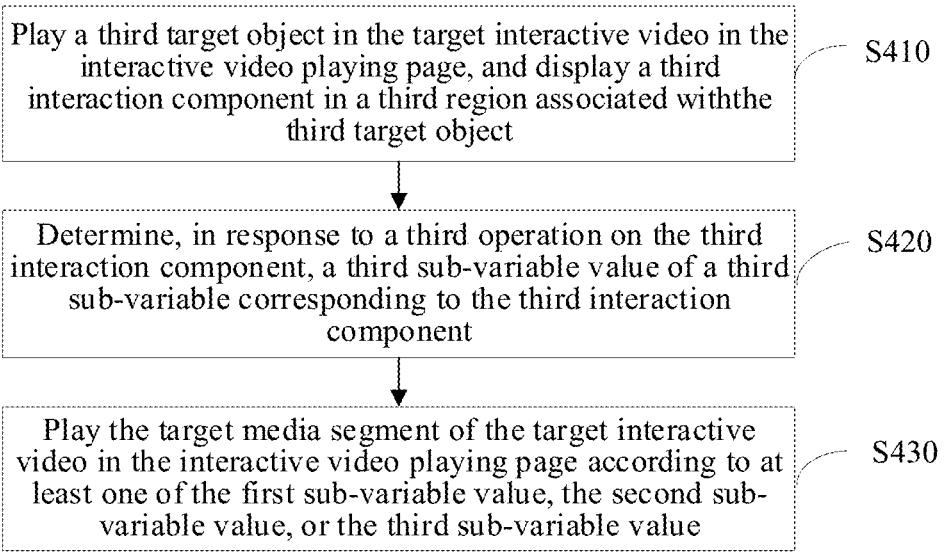
FIG. 4 is a flowchart based on step S240 of FIG. 2 in an exemplary embodiment.

FIG. 4 is a flowchart based on step S240 of FIG. 2 in an exemplary embodiment.

As shown in FIG. 4, step S240 in the embodiment of FIG. 2 may further include the following steps:

Step S410: Play a third target object in the target interactive video in the interactive video playing page, and display a third interaction component in a third region associated with the third target object.

In this embodiment of the present disclosure, the third target object may be a video element in the target interactive video. The third region associated with the third target object may be a specific occurrence position of the third target object in the target interactive video. In this embodiment, the third interaction component is displayed in the third associated region when the third target object is played, so that the third target object and the third interaction component can be associated.

Step S420: Determine, in response to a third operation on the third interaction component, a third sub-variable value of a third sub-variable corresponding to the third interaction component.

In this embodiment of the present disclosure, the third operation is similar to the first operation, and may also be, but not limited to, a click operation, a double click operation, or a slide operation.

Step S430: Play the target media segment of the target interactive video in the interactive video playing page according to at least one of the first sub-variable value, the second sub-variable value, or the third sub-variable value.

In this embodiment of the present disclosure, a target determining condition of the target media segment may be obtained, and the first sub-variable value, the second sub-variable value, and the third sub-variable value are determined according to the target determining condition. When at least one of the first sub-variable value, the second sub-variable value, or the third sub-variable value meets the target determining condition, the target media segment of the target interactive video is played in the interactive video playing page.

In this embodiment, at least one of the first sub-variable value of the first sub-variable, the second sub-variable value of the second variable, or the third sub-variable value of the third sub-variable is used as a determining condition, so that the target media segment in the interactive video can be interacted and played in response to the first operation, the second operation, or the third operation, thereby enriching the interactivity and interactive content of the target interactive video.

Figure 5:
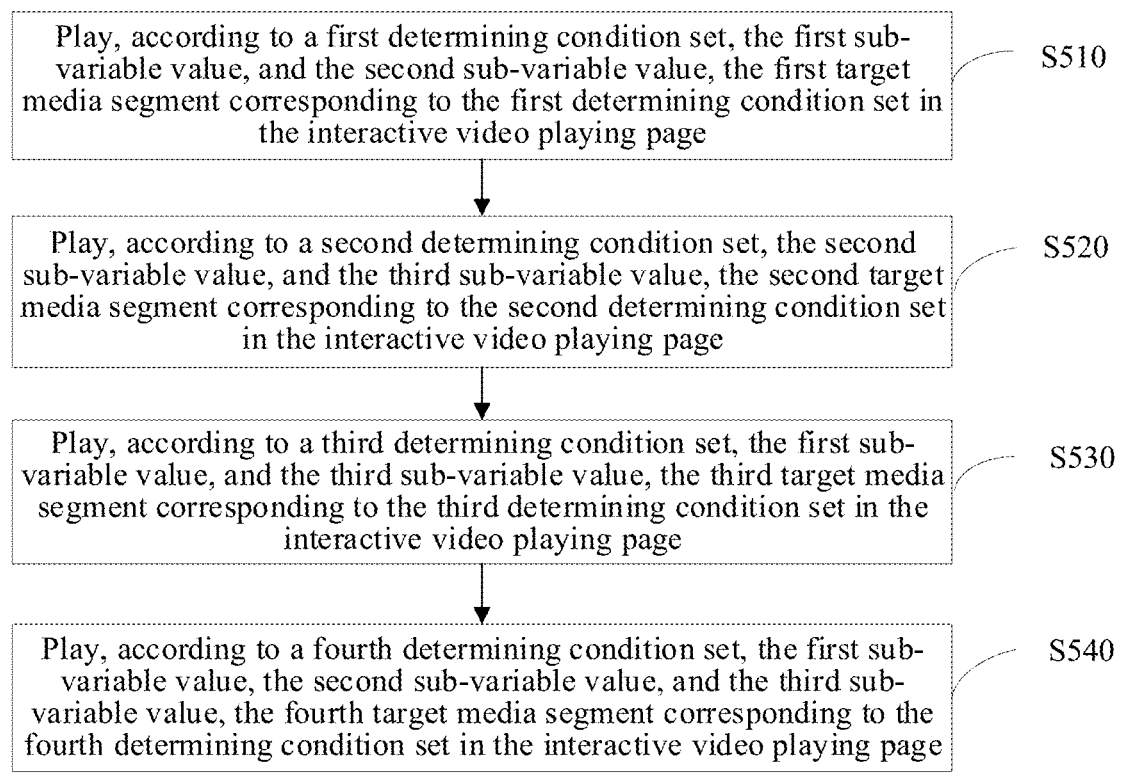
FIG. 5 is a flowchart based on step S430 of FIG. 4 in an exemplary embodiment.

FIG. 5 is a flowchart based on step S430 of FIG. 4 in an exemplary embodiment.

In this embodiment, the target media segment may include at least one of a first target media segment, a second target media segment, a third target media segment, or a fourth target media segment. As shown in FIG. 5, step S430 in the embodiment of FIG. 4 may further include at least one of the following steps:

Step S510: Play, according to a first determining condition set, the first sub-variable value, and the second sub-variable value, the first target media segment corresponding to the first determining condition set in the interactive video playing page.

In this embodiment of the present disclosure, the first determining condition set may include a first determining condition corresponding to the first sub-variable value and a second determining condition corresponding to the second sub-variable value. The first target media segment corresponding to the first determining condition set may be played in the interactive video playing page when the first sub-variable value meets the first determining condition and the second sub-variable value meets the second determining condition. The first determining condition may include a first condition threshold, and the second determining condition may include a second condition threshold. The first sub-variable value meeting the first determining condition may be that, but not limited to that, the first sub-variable value is greater than or equal to the first condition threshold, and the second sub-variable value meeting the second determining condition may be that, but not limited to that, the second sub-variable value is greater than or equal to the second condition threshold.

Step S520: Play, according to a second determining condition set, the second sub-variable value, and the third sub-variable value, the second target media segment corresponding to the second determining condition set in the interactive video playing page.

In this embodiment of the present disclosure, the second determining condition set may include a second determining condition corresponding to the second sub-variable value and a third determining condition corresponding to the third sub-variable value. The second target media segment corresponding to the second determining condition set may be played in the interactive video playing page when the second sub-variable value meets the second determining condition and the third sub-variable value meets the third determining condition. The second determining condition may include a second condition threshold, and the third determining condition may include a third condition threshold. The second sub-variable value meeting the second determining condition may be that, but not limited to that, the second sub-variable value is greater than or equal to the second condition threshold, and the third sub-variable value meeting the third determining condition may be that, but not limited to that, the third sub-variable value is greater than or equal to the third condition threshold.

Step S530: Play, according to a third determining condition set, the first sub-variable value, and the third sub-variable value, the third target media segment corresponding to the third determining condition set in the interactive video playing page.

In this embodiment of the present disclosure, the third determining condition set may include a first determining condition corresponding to the first sub-variable value and a third determining condition corresponding to the third sub-variable value. This step may adopt operations similar to step S510 or step S520, and details are not described herein again.

Step S540: Play, according to a fourth determining condition set, the first sub-variable value, the second sub-variable value, and the third sub-variable value, the fourth target media segment corresponding to the fourth determining condition set in the interactive video playing page.

In this embodiment of the present disclosure, the fourth determining condition set may include a first determining condition corresponding to the first sub-variable value, a second determining condition corresponding to the second sub-variable value, and a third determining condition corresponding to the third sub-variable value. This step may adopt operations similar to step S510, step S520, or step S530, and details are not described herein again.

In an exemplary embodiment, a fourth target object, a fifth target object, a fourth interaction component, a fifth interaction component, a fourth determining condition set, and a fifth determining condition set may also be included. In this embodiment, any determining condition of the first sub-variable, the second sub-variable, and the third sub-variable may be combined, to combine any operation on the first target object, the second target object, and the third target object, and combination results are associated with different target media segments. Therefore, different types of complex function settings are abstracted into a universal component template, and an interaction combination capability of an interactive video in different scenarios are implemented based on the universal component template.

Figure 6:
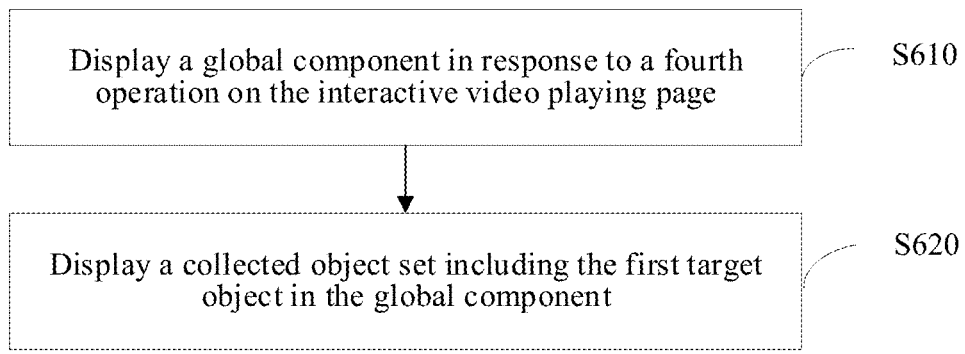
FIG. 6 is a schematic flowchart of a video interaction method according to an embodiment of the present disclosure.

FIG. 6 is a schematic flowchart of a video interaction method according to an embodiment of the present disclosure.

As shown in FIG. 6, the video interaction method based on the foregoing embodiments may further include the following steps:

Step S610: Display a global component in response to a fourth operation on the interactive video playing page.

In this embodiment of the present disclosure, the fourth operation may be, for example, a click operation on an entrance page of the global component. The global component is a component acting on a plurality of or all videos in the target interactive video, and the interaction component may be a component acting on a single video segment of the target interactive video.

Step S620: Display a collected object set including the first target object in the global component.

In this embodiment of the present disclosure, the global component may be, but not limited to, a collection system component, an achievement system component, or a preference system component. The global component may include a plurality of to-be-collected objects, and the plurality of to-be-collected objects may include the first target object. Based on operations of step S210 to step S240, the first target object may be determined as a collected object of the global component.

In this embodiment, according to displaying based on the fourth operation and the collected object set associated with the global component, a display function of a game interface of the interactive video can be achieved.

Figure 7:
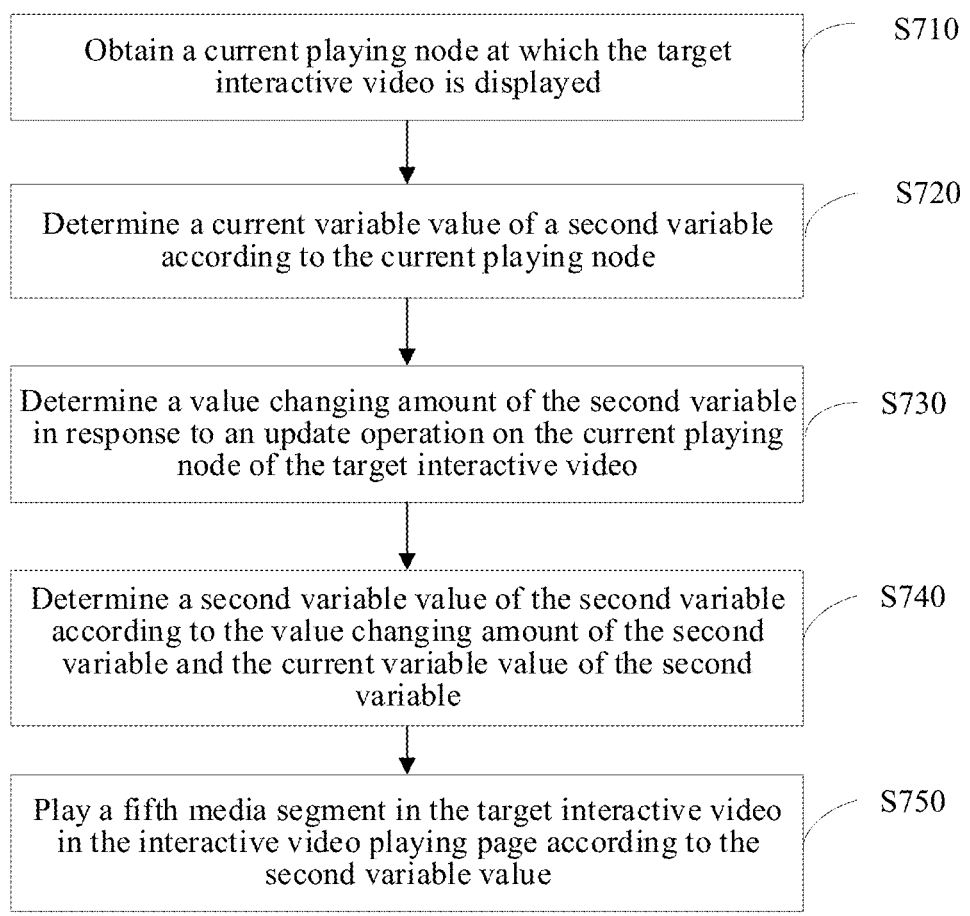
FIG. 7 is a schematic flowchart of a video interaction method according to an embodiment of the present disclosure.

FIG. 7 is a schematic flowchart of a video interaction method according to an embodiment of the present disclosure.

As shown in FIG. 7, the video interaction method based on the foregoing embodiments may further include the following steps:

Step S710: Obtain a current playing node at which the target interactive video is played.

In this embodiment of the present disclosure, the current playing node may be a node position at which a media segment currently played in the target interactive video is located.

Step S720: Determine a current variable value of a second variable according to the current playing node.

In this embodiment of the present disclosure, a variable value of the second variable may be determined according to a position of the current playing node in the target interactive video.

Step S730: Determine a value changing amount of the second variable in response to an update operation on the current playing node of the target interactive video.

In this embodiment of the present disclosure, the update operation may be an update operation on the current playing node of the target interactive video. That is, the current playing node of the target interactive video may be changed through the update operation. During determination of the value changing amount of the second variable, the value changing amount of the second variable may be determined according to the current playing node before a change operation and the current playing node after the change operation.

Step S740: Determine a second variable value of the second variable according to the value changing amount of the second variable and the current variable value of the second variable.

Step S750: Play a fifth media segment of the target interactive video in the interactive video playing page according to the second variable value.

In this embodiment of the present disclosure, the fifth media segment of the target interactive video may be played in the interactive video playing page when the second variable value meets a fifth determining condition corresponding to the fifth media segment. The fifth determining condition corresponding to the fifth media segment may include a second variable threshold. The second variable value meeting the fifth determining condition corresponding to the fifth media segment may be that the second variable value is greater than or equal to the second variable threshold; or the second variable value is less than or equal to the second variable threshold, which is not specifically limited in the technical solutions of the present disclosure.

In this embodiment, the second variable value of the second variable and the current playing node of the target interactive video are associated, condition determination is performed according to the second variable value of the second variable, and the fifth media segment is played when the determining condition of the fifth media segment is met. Therefore, the playing node of the interactive video may be used as a consideration factor for condition determination, to achieve a smart interaction function of a video.

Figure 8:
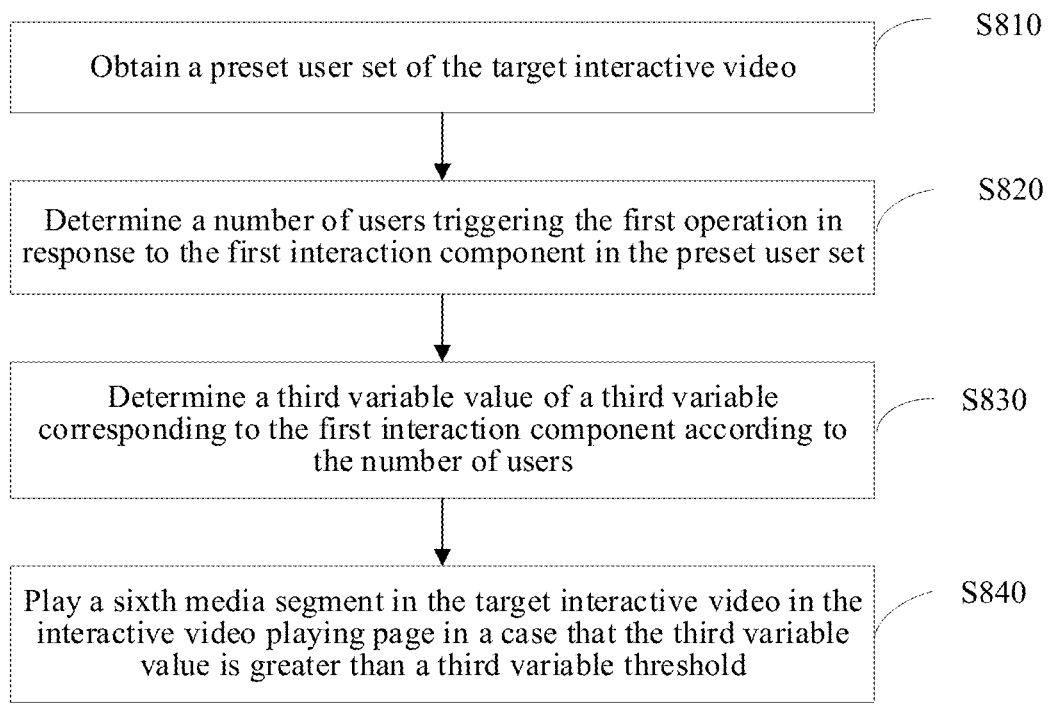
FIG. 8 is a schematic flowchart of a video interaction method according to an embodiment of the present disclosure.

FIG. 8 is a schematic flowchart of a video interaction method according to an embodiment of the present disclosure.

As shown in FIG. 8, the video interaction method based on the foregoing embodiments may further include the following steps:

S810: Obtain a preset user set of the target interactive video.

In this embodiment of the present disclosure, the preset user set may be, but not limited to, a user set of the target interactive video played at a current time.

Step S820: Determine a number of users triggering the first operation in response to the first interaction component in the preset user set.

In this embodiment of the present disclosure, the first operation triggered in response to the first interaction component in the preset user set may be a like operation or a vote operation.

Step S830: Determine a third variable value of a third variable corresponding to the first interaction component according to the number of users.

In this embodiment of the present disclosure, the number of users may be used as the third variable value of the third variable.

Step S840: Play a sixth media segment of the target interactive video in the interactive video playing page when the third variable value is greater than a third variable threshold.

In this embodiment, by determining the third variable value of the third variable according to the number of users triggering the first operation in response to the first interaction component in the user set, interaction responses to the target interactive video among the users in the preset user set may be implemented.

Figure 9:
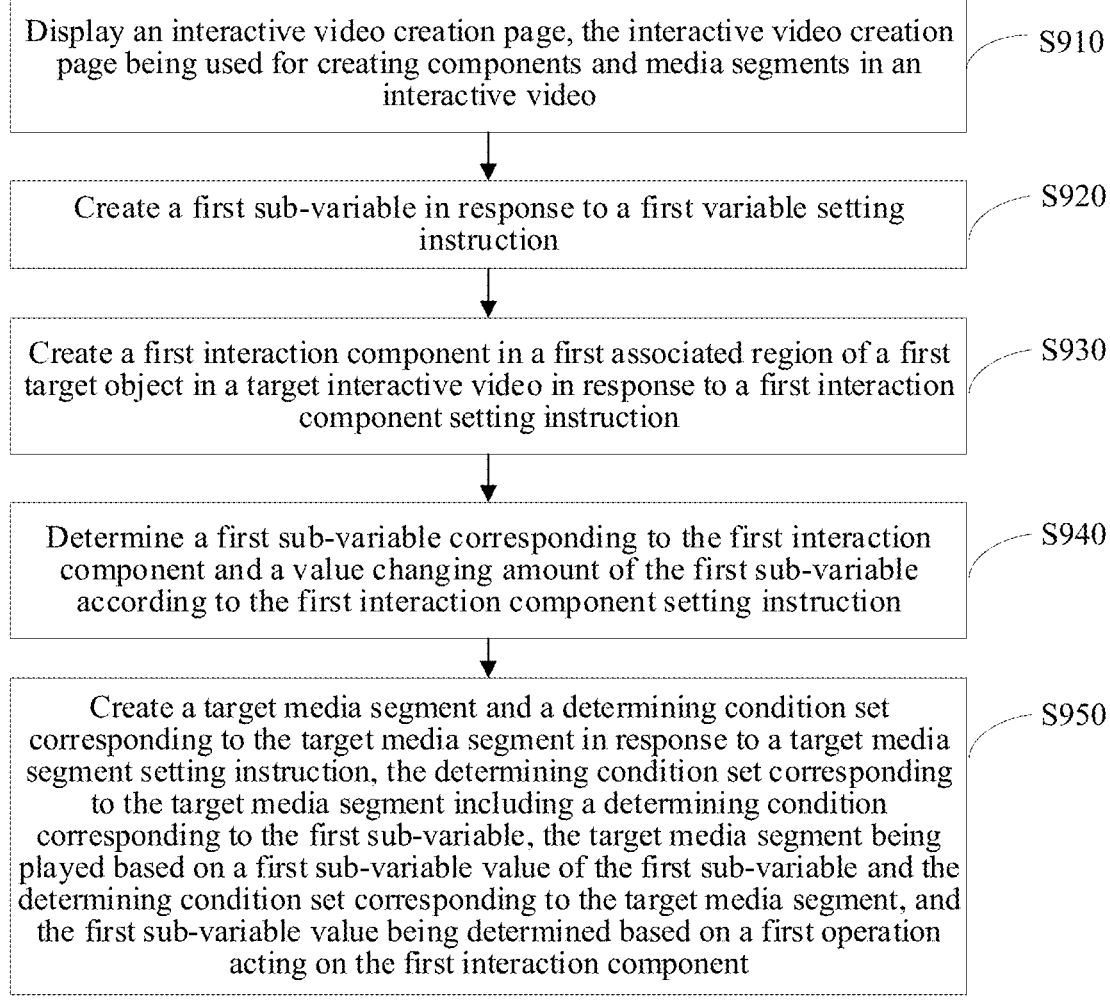
FIG. 9 is a schematic flowchart of a video interaction method according to an embodiment of the present disclosure.

FIG. 9 is a schematic flowchart of a video interaction method according to an embodiment of the present disclosure. The method provided in this embodiment of the present disclosure may be processed by any electronic device having a computing processing capability, such as the server or the terminal device in the embodiment of FIG. 1. A description is made by using an example in which a terminal device is an execution entity in the following embodiments, and the present disclosure is not limited thereto.

As shown in FIG. 9, the video interaction method provided in this embodiment includes the following steps:

Step S910: Display an interactive video creation page, the interactive video creation page being used for creating components and media segments in an interactive video.

In this embodiment of the present disclosure, the interactive video creation page is provided for the user, so that the user performs creation on the interactive video creation page, to create an interactive video. On the interactive video creation page, the user may create components and media segments in the interactive video, so that a corresponding media segment may be played in response to a related operation on the components when the interactive video is played.

Step S920: Create a first sub-variable in response to a first variable setting instruction.

Figure 12:
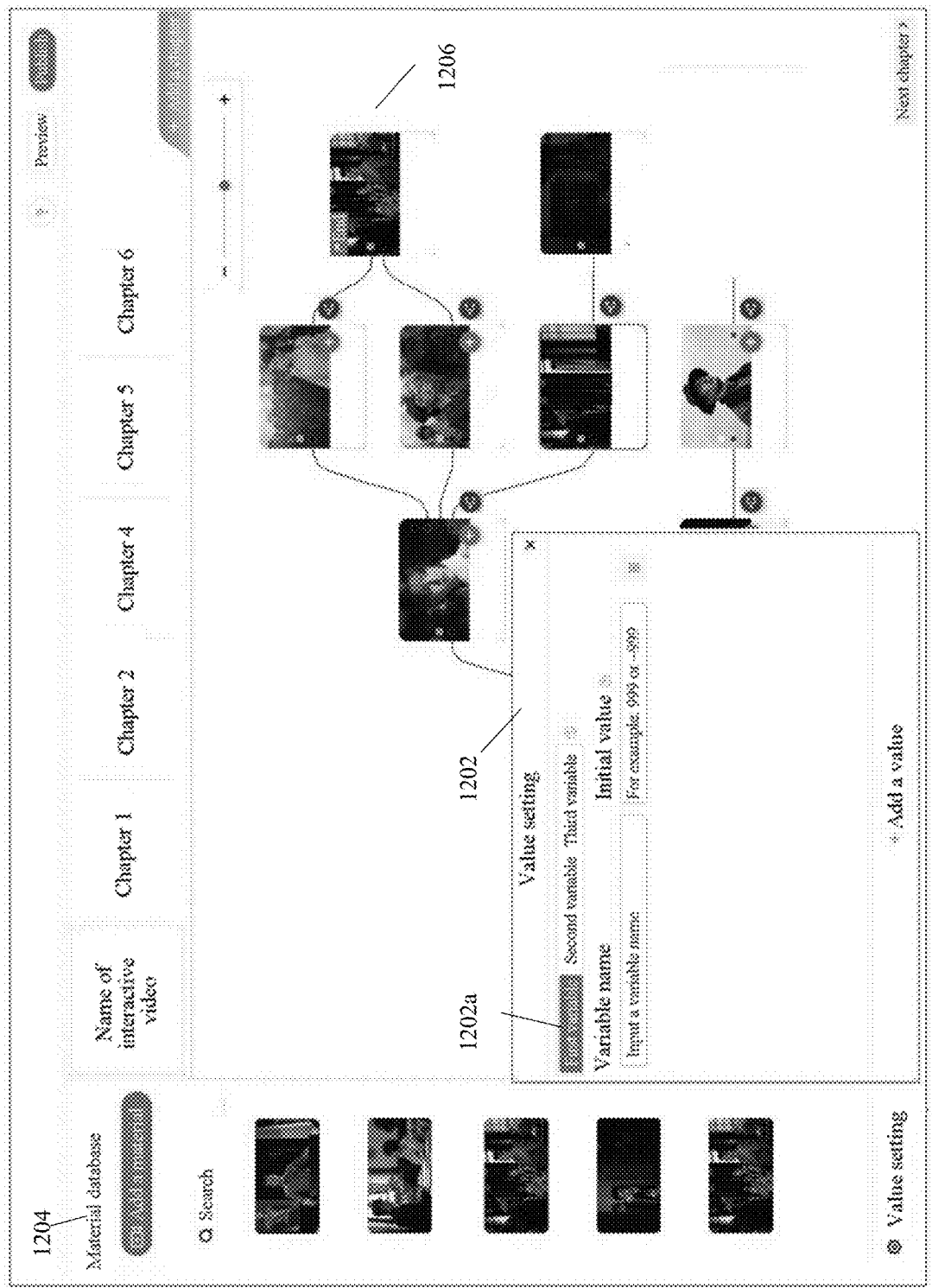
FIG. 12 is a schematic interface diagram of a first variable setting instruction.

FIG. 12 is a schematic interface diagram of a first variable setting instruction. As shown in FIG. 12, a first part on the left side is used for displaying of a material database 1204, and a "value setting" region 1202 below the first part is an entrance for creating the first variable setting instruction. A part on the right side 1206 is used for displaying used materials and a node position relationship among the materials. A "value setting" window in a lower left corner region of the part on the right side is an interface diagram for creating the first variable setting instruction 1202a. The first variable setting instruction may include a variable name and an initial value. A first sub-variable may be created according to the variable name and the initial value included in the first variable setting instruction.

Step S930: Create a first interaction component in a first region associated with a first target object in a target interactive video in response to a first interaction component setting instruction.

Figure 13:
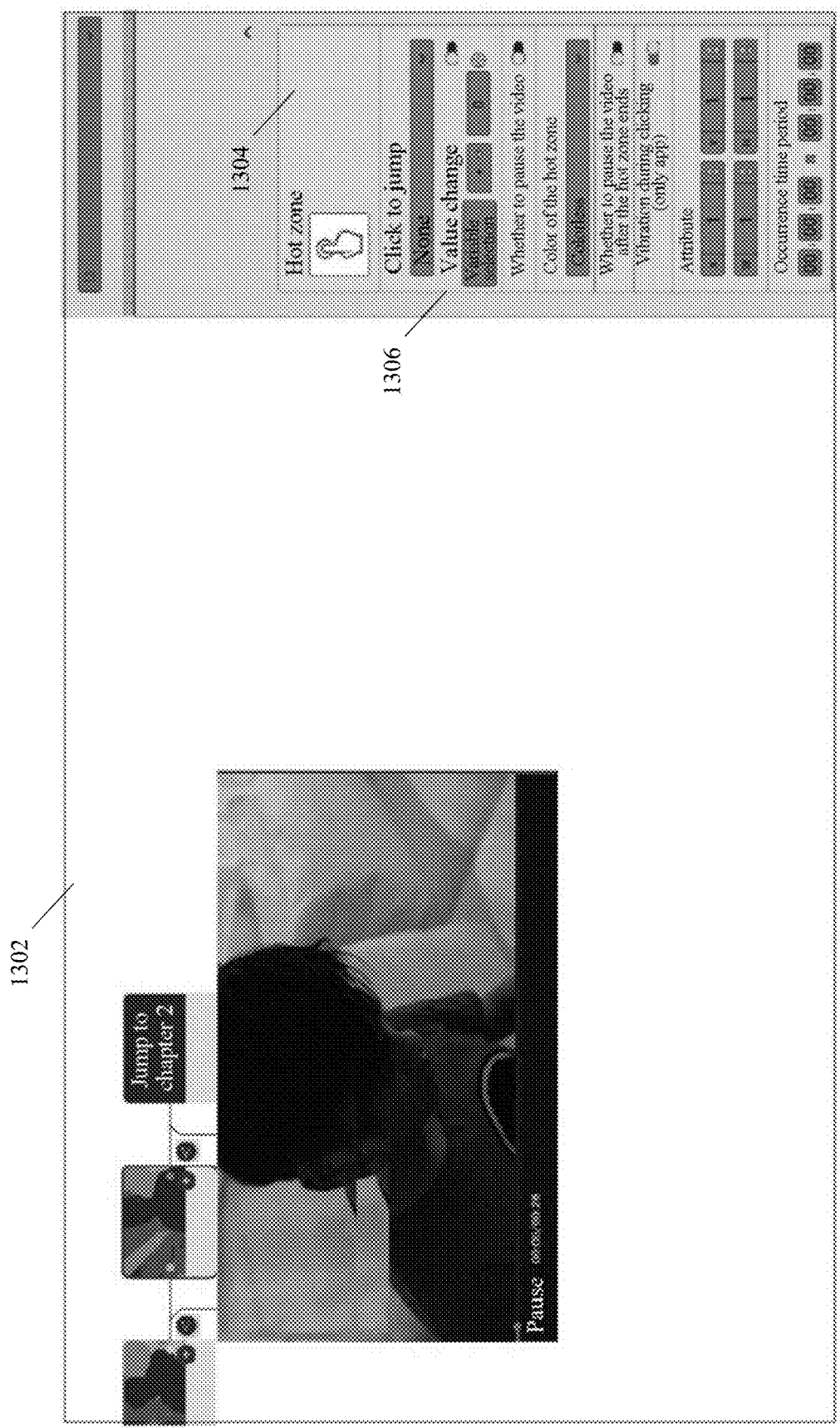
FIG. 13 is a schematic interface diagram of a first interaction component setting instruction.

FIG. 13 is a schematic interface diagram of a first interaction component setting instruction. As shown in FIG. 13, a left region 1302 is used for displaying a media segment into which a first interaction component is to be set, and a right part is used for setting a component hot zone. The right part includes a hot zone setting part 1304 and a value change setting part 1306. The user may drag a hot zone onto any position of any frame of the interactive video on the hot zone setting part to set the first interaction component. The any position of any frame may be the first target object, and a region of the any position of any frame is the first region associated with the first target object.

Step S940: Determine a first sub-variable corresponding to the first interaction component and a value changing amount of the first sub-variable according to the first interaction component setting instruction.

In this embodiment of the present disclosure, as shown in FIG. 13, the user may set the first sub-variable in a "variable selection" region of the value change setting part, and set the value changing amount of the first sub-variable on a right part of "variable selection", so that the first interaction component setting instruction may be generated according to the first sub-variable and the value changing amount of the first sub-variable filled in a "value change" region.

Step S950: Create a target media segment and a determining condition set corresponding to the target media segment in response to a target media segment setting instruction, the determining condition set corresponding to the target media segment including a determining condition corresponding to the first sub-variable, the target media segment being played based on a first sub-variable value of the first sub-variable and the determining condition set corresponding to the target media segment, and the first sub-variable value being determined based on a first operation acting on the first interaction component.

Figure 14:
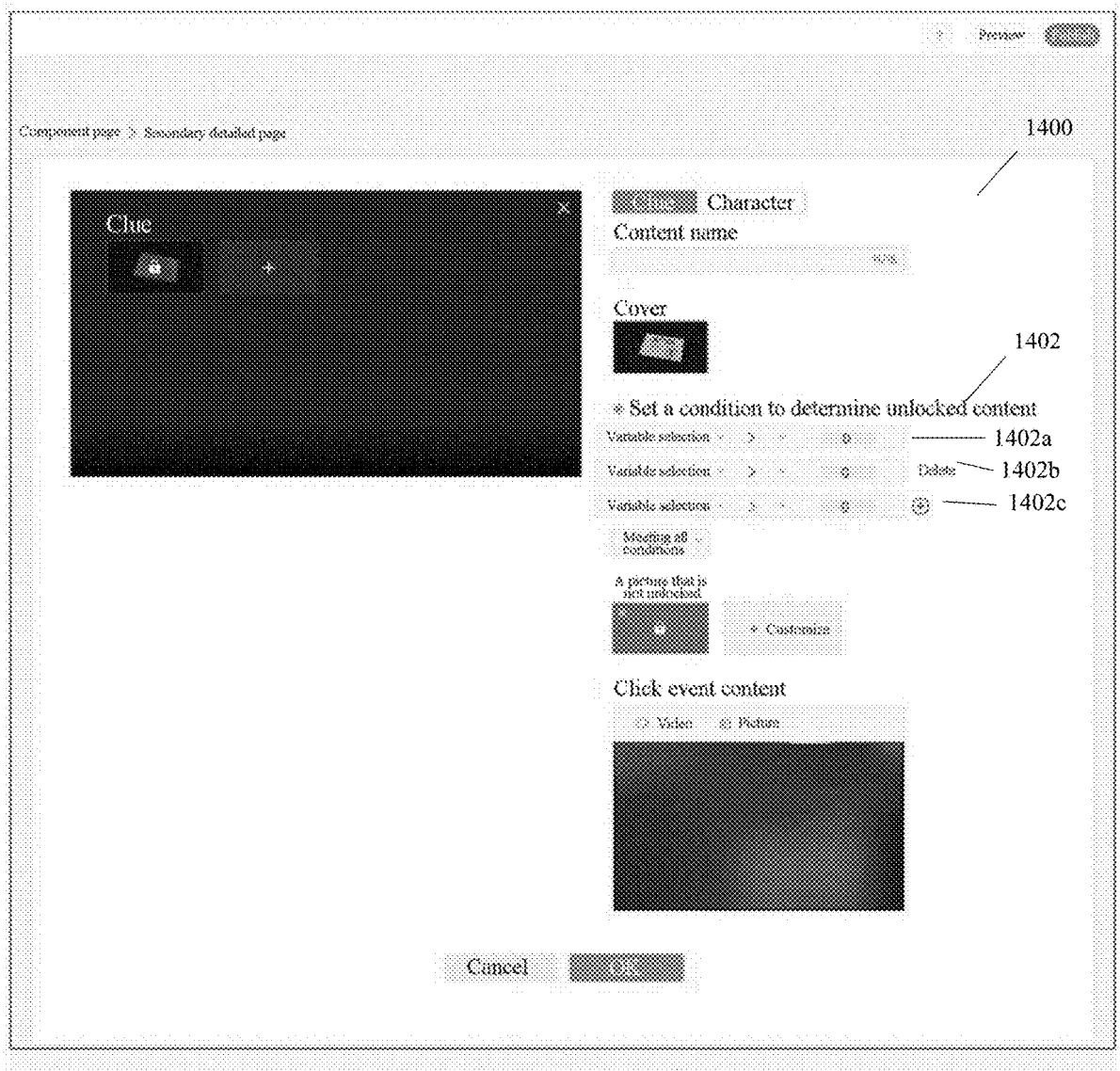
FIG. 14 is a schematic interface diagram of a target media segment setting instruction.

FIG. 14 is a schematic interface diagram of a target media segment setting instruction. As shown in FIG. 14, the target media segment setting instruction may be generated according to the interface diagram 1400 of the target media segment setting instruction. The target media segment setting instruction may include at least one determining condition 1402, each determining condition may include a first variable (for example, a first sub-variable 1402a, a second sub-variable 1402b, or a third sub-variable 1402c) and a determining condition (for example, the first sub-variable is greater than 10, and 10 is a first variable threshold) of the first variable. The target media segment may be a video or a picture, which is not specifically limited in the present disclosure.

In this embodiment, the first variable setting instruction, the first interaction component setting instruction, and the target media segment setting instruction are responded, so that association among the first sub-variable, the first target object, the first associated region, the first interaction component, and the target media segment may be implemented. The generated interactive video can trigger interaction and playing of the target media segment by responding to the first operation on the first associated region, to enrich the interactivity and interactive content of the target interactive video.

Figure 15:
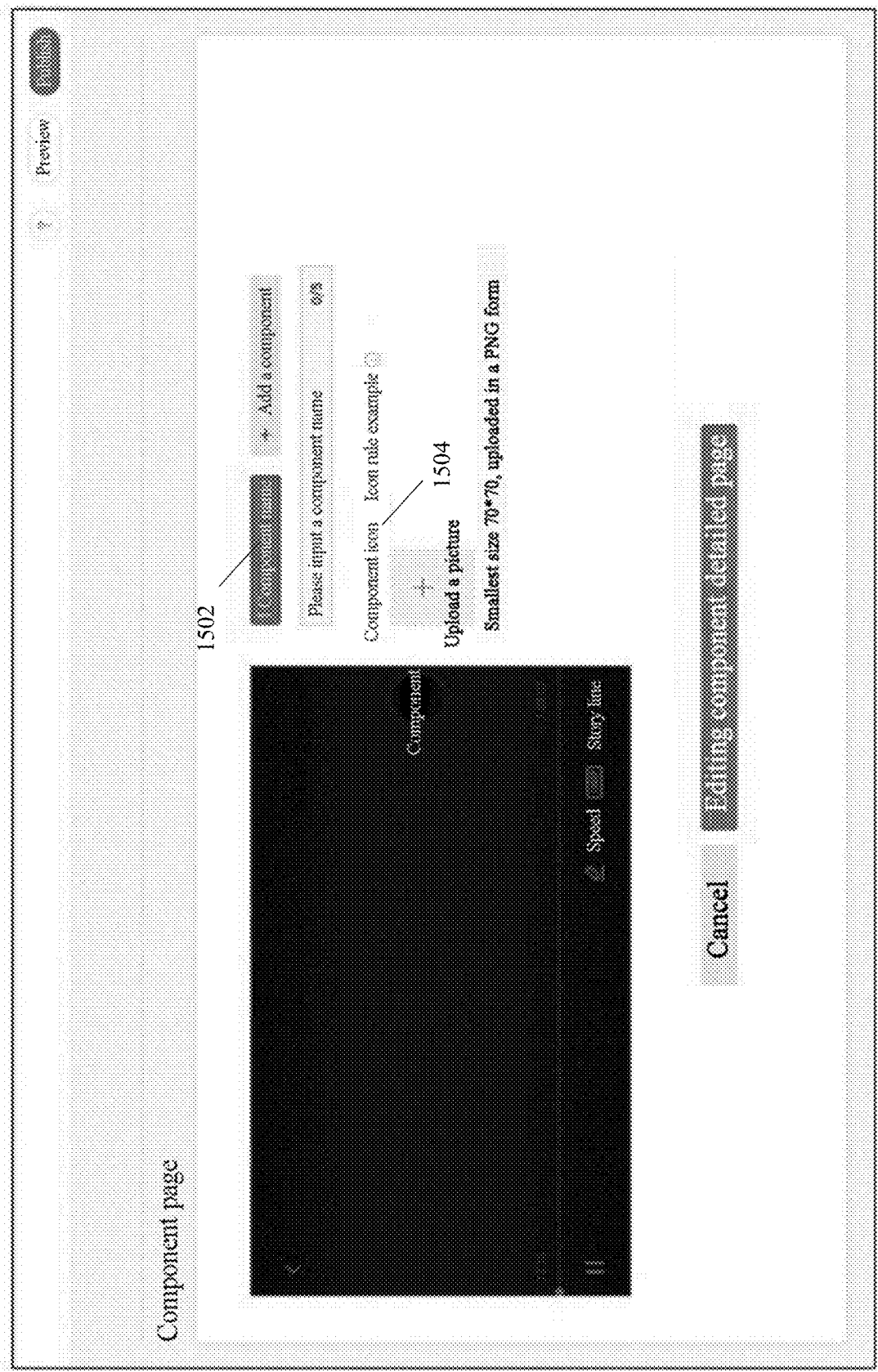
FIG. 15 is a schematic interface diagram of a global component setting instruction.

In an exemplary embodiment, the video interaction method according to this embodiment of the present disclosure may further include the following step S960: Create, in response to a global component setting command, a global component and a collected object set corresponding to the global component and including the first target object. FIG. 15 is a schematic interface diagram of a global component setting instruction. As shown in FIG. 15, the global component setting instruction may include a component name 1502 and a component icon 1504; and may further include a collected object set. In this embodiment, an interactive video having an interactive display function can be generated through the global component setting instruction.

Figure 10:
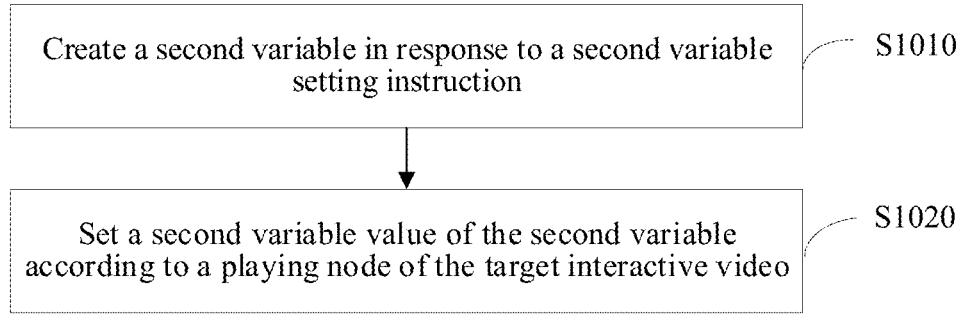
FIG. 10 is a schematic flowchart of a video interaction method according to an embodiment of the present disclosure.

FIG. 10 is a schematic flowchart of a video interaction method according to an embodiment of the present disclosure.

The video interaction method based on the foregoing embodiments may further include the following steps:

Step S1010: Create a second variable in response to a second variable setting instruction.

Figure 16:
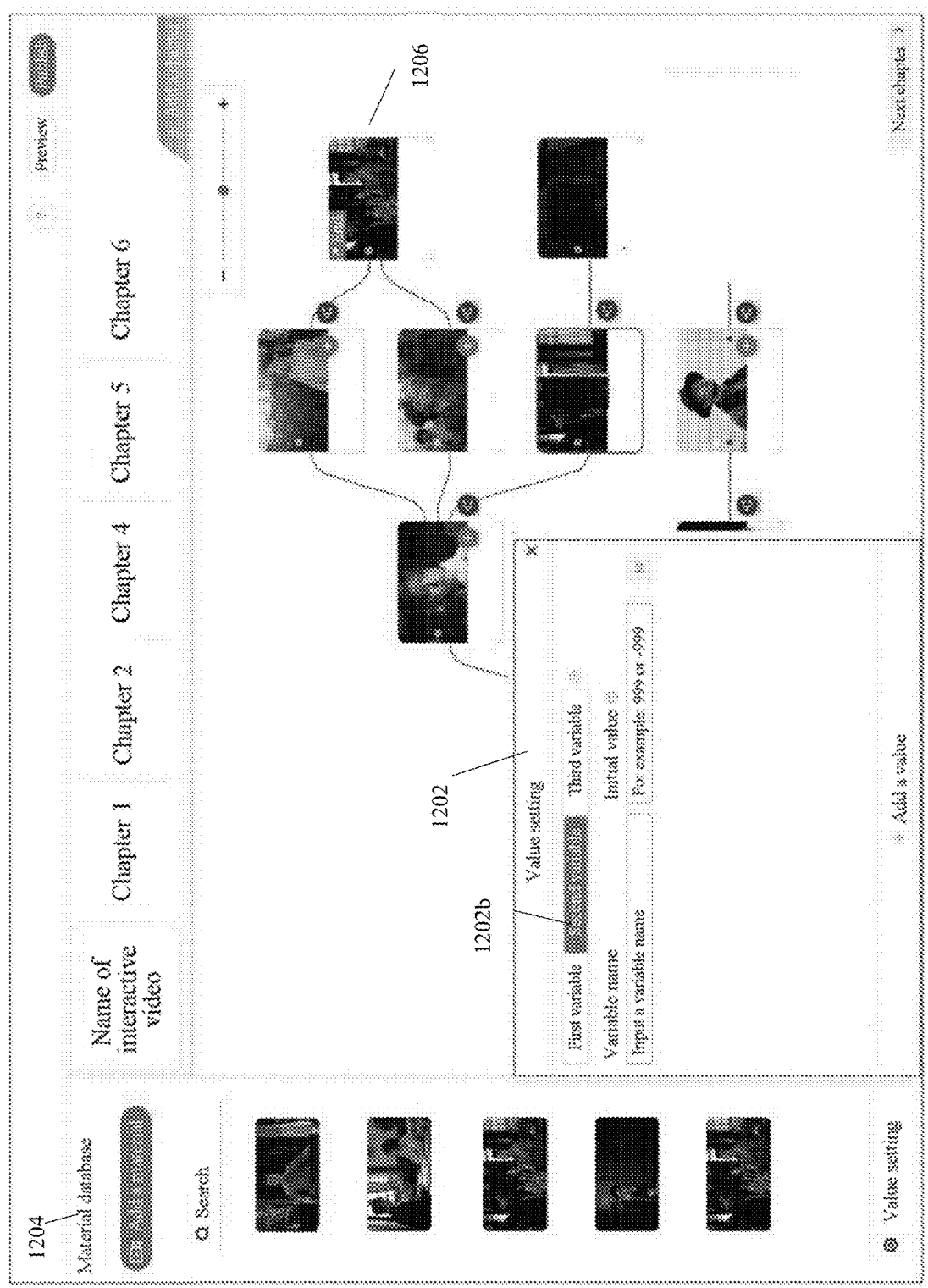
FIG. 16 is a schematic interface diagram of a second variable setting instruction.

FIG. 16 is a schematic interface diagram of a second variable setting instruction. As shown in FIG. 16, a page layout thereof and a function of each region are similar to those of FIG. 12, and details are not described herein again. The second variable setting instruction 1202b may include a variable name and an initial value. A second variable may be created according to the variable name and the initial value included in the second variable setting instruction.

Step S1020: Set a second variable value of the second variable according to a playing node of the target interactive video.

In this embodiment of the present disclosure, the second variable value of the second variable may change according to different playing nodes, to implement the procedure of step S710 to step S750.

Figure 11:
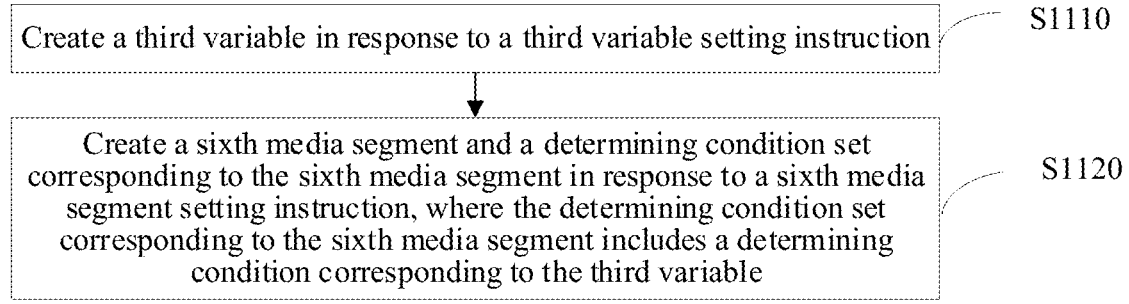
FIG. 11 is a schematic flowchart of a video interaction method according to an embodiment of the present disclosure.

FIG. 11 is a schematic flowchart of a video interaction method according to an embodiment of the present disclosure.

As shown in FIG. 11, the video interaction method based on the foregoing embodiments may further include the following steps:

Step S1110: Create a third variable in response to a third variable setting instruction.

Figure 17:
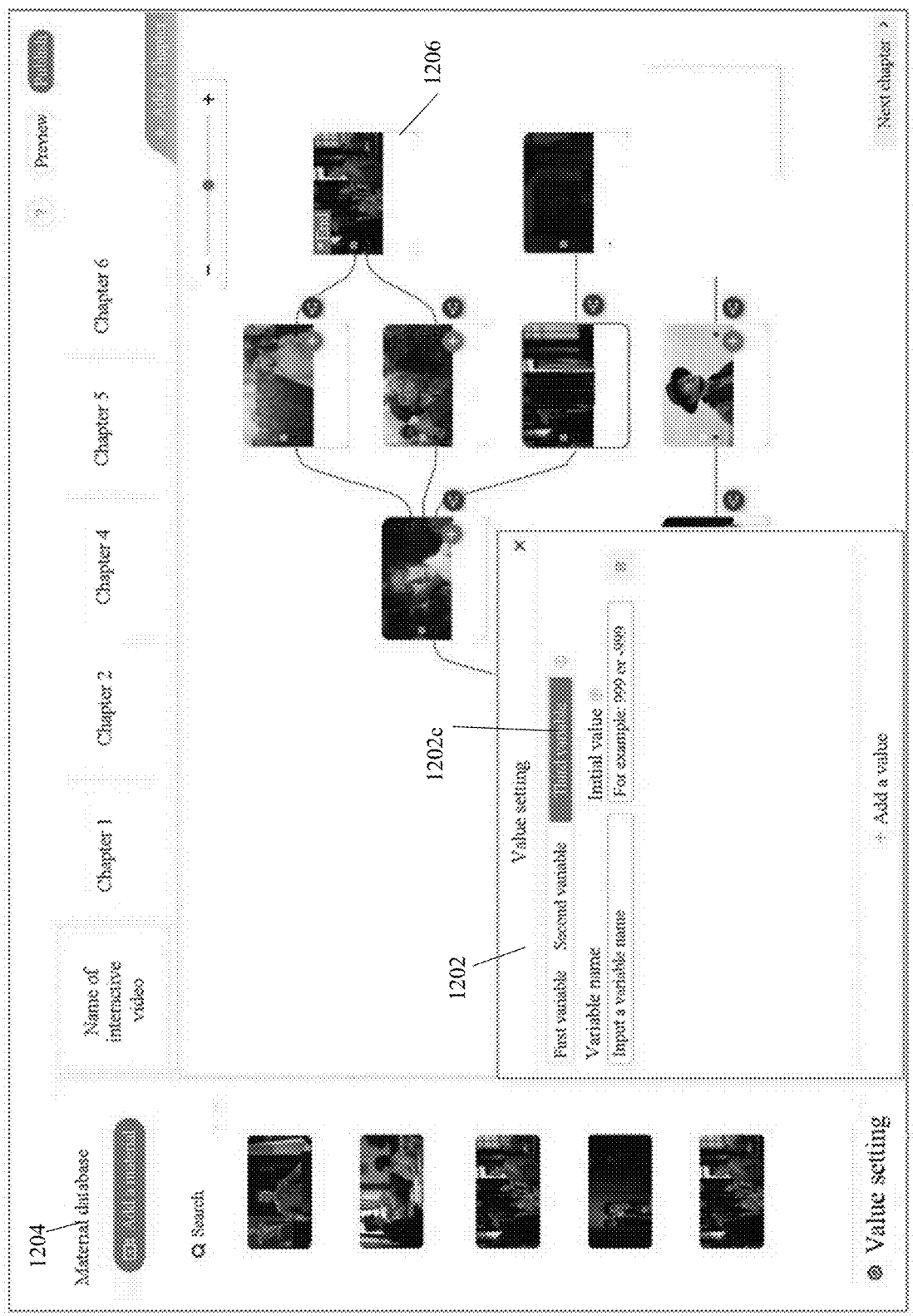
FIG. 17 is a schematic interface diagram of a third variable setting instruction.

FIG. 17 is a schematic interface diagram of a third variable setting instruction. As shown in FIG. 17, the third variable setting instruction 1202c may include a variable name and an initial value. A third variable may be created according to the variable name and the initial value included in the third variable setting instruction.

Step S1120: Create a sixth media segment and a determining condition set corresponding to the sixth media segment in response to a sixth media segment setting instruction, where the determining condition set corresponding to the sixth media segment includes a determining condition corresponding to the third variable.

In this embodiment of the present disclosure, the third variable and the sixth media segment are associated, so that the procedure of step S810 to step S840 can be implemented based on the third variable and the determining condition set corresponding to the sixth media segment.

Figure 18:
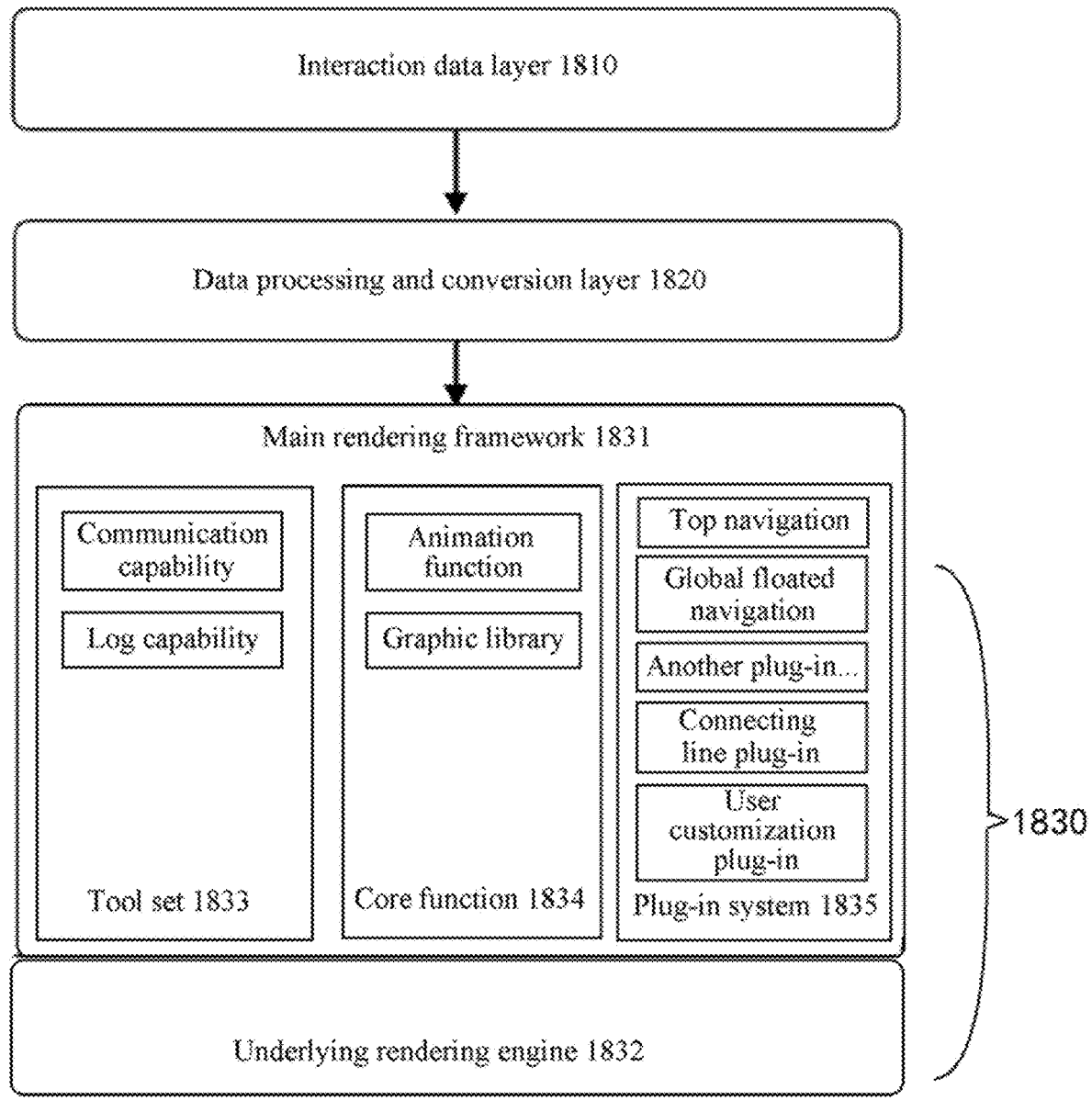
FIG. 18 is a schematic diagram of a data architecture of a video interaction method.

FIG. 18 is a schematic diagram of a data architecture of a video interaction method.

As shown in FIG. 18, the data architecture diagram of the video interaction method according to this embodiment of the present disclosure may be used to support execution of flowcharts of FIG. 2, FIG. 3, FIG. 4, FIG. 5, FIG. 6, FIG. 7, FIG. 8, FIG. 9, FIG. 10, and FIG. 11. The data architecture of this embodiment of the present disclosure may include an interaction data layer 1810, a data processing and conversion layer 1820, and a data rendering layer 1830. The data rendering layer 1830 may include a main rendering framework 1831 and an underlying rendering engine 1832.

In the data architecture diagram of the video interaction method, the interaction data layer 1810 may be provided by a uniform data requesting tool, and components (an interaction component and a global component) may provide interaction data information through a web page (for example, H5) interaction layer. The data processing and conversion layer 1820 may convert data fields returned by a backend into universal data rendering fields of a front end, to facilitate data field modification and switch and change caused by a newly added data source. The main rendering framework 1831 may include a tool set 1833, a core function 1834, and a plug-in system 1835. The underlying rendering engine 1832 may provide a basic canvas rendering capability.

Figure 19:
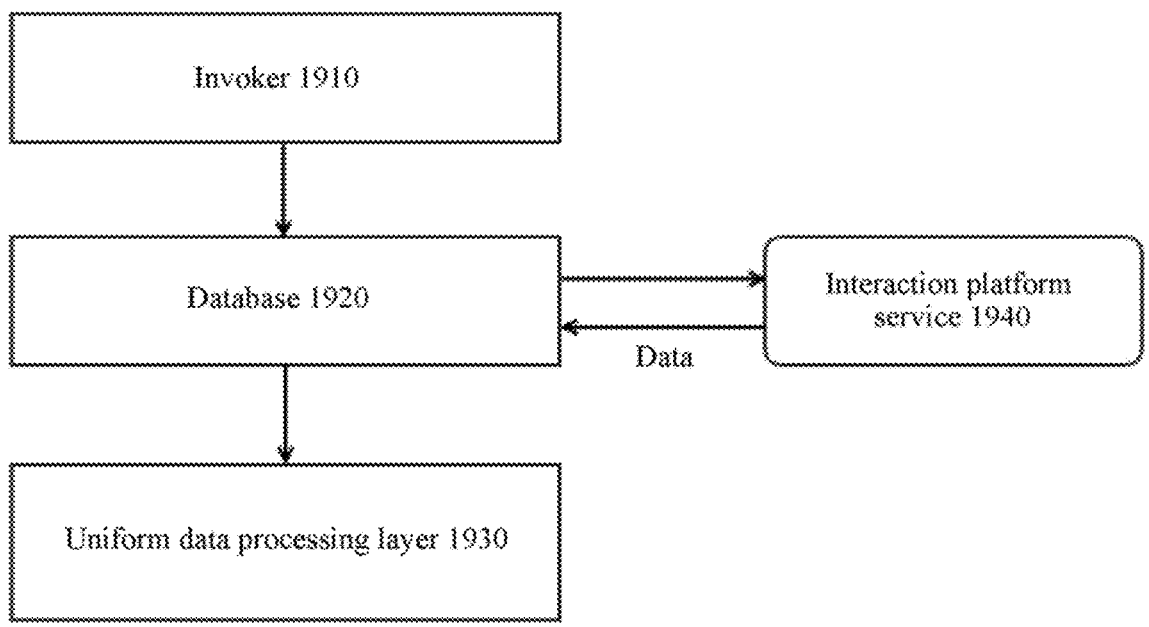
FIG. 19 is a schematic diagram of an implementation method for an interaction data layer.

The flowchart shown in FIG. 2 is used as an example, when the interactive video playing page playing the target interactive video is displayed, the interaction data layer 1810 may request an interaction platform service through a database (for example, an axios database). FIG. 19 is a schematic diagram of an implementation method for an interaction data layer. As shown in FIG. 19, an invoker 1910 requests an interaction platform service 1940 through a database 1920, to perform data processing on data through a uniform data processing layer 1930 after the data is obtained.

The data processing and conversion layer 1820 may map a default field into a field understood by the rendering layer through a mapping table, and a field customized by the user is converted according to the same set of conversion rules.

Figure 20:
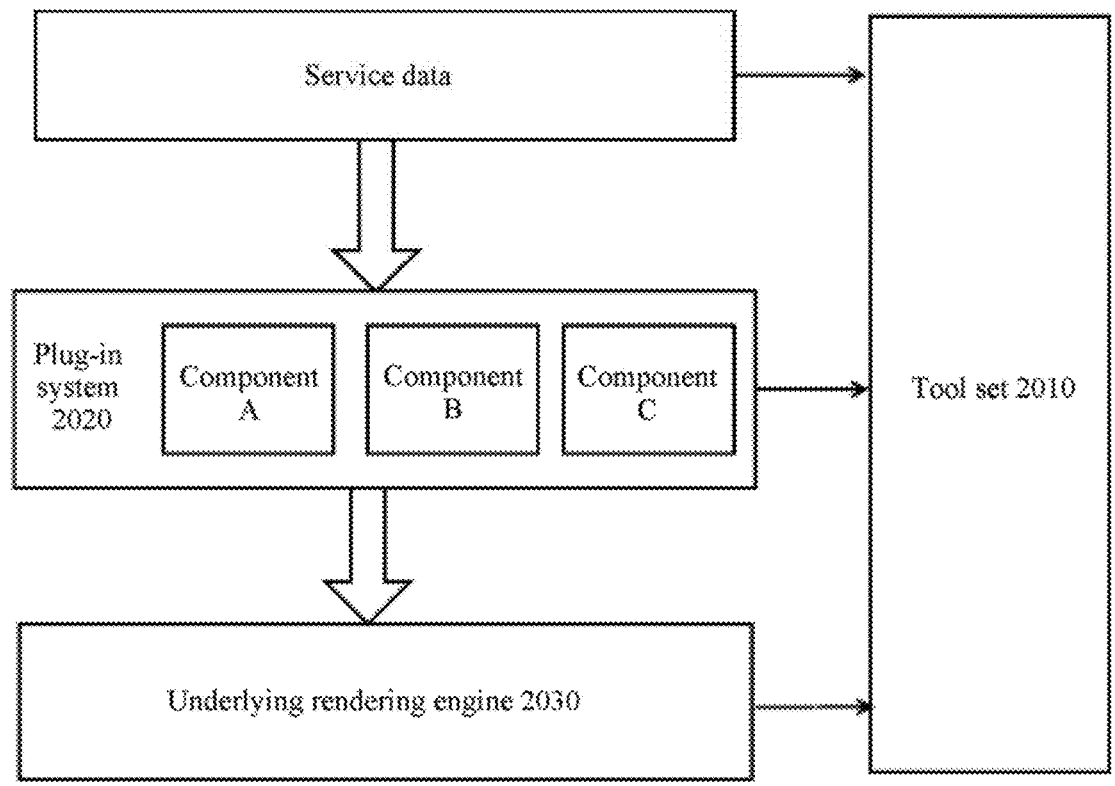
FIG. 20 is a schematic diagram of an implementation method for a data rendering layer.
Figure 21:
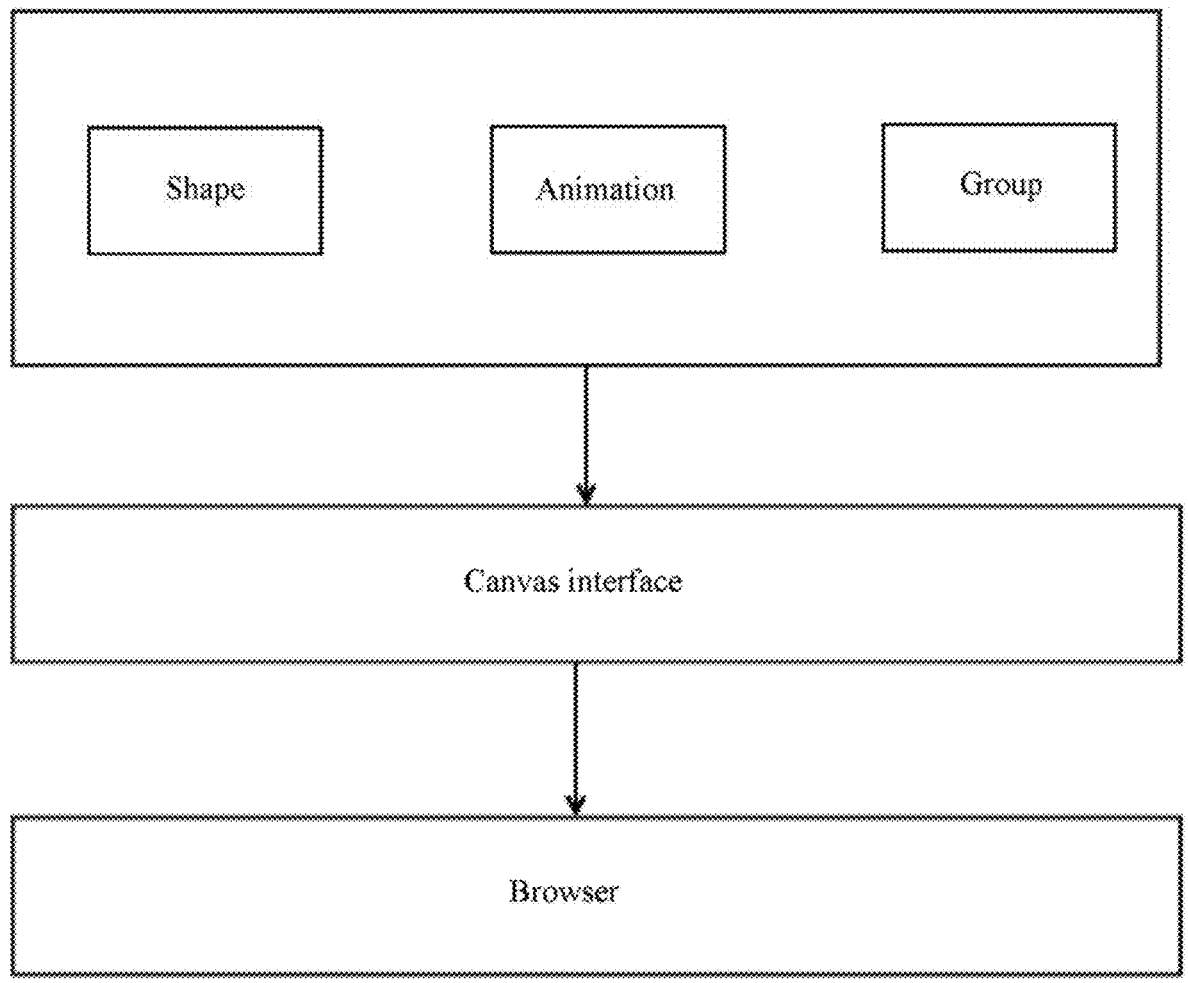
FIG. 21 is a schematic diagram of an implementation method for an underlying rendering engine.

After specific data and service logic are obtained, the main rendering framework 1831 in the data rendering layer 1830 renders the data and the service logic into specific components uniformly, for example, the first interaction component, to play the first target object in the target interactive video in the interactive video playing page and display the first interaction component in the first region associated with the first target object in step S220. The data rendering layer 1830 may provide a uniform rendering interface. FIG. 20 is a schematic diagram of an implementation method for a data rendering layer. As shown in FIG. 20, the tool set 2010 and the plug-in system 2020 render service data and service logic, to obtain specific components. The underlying rendering engine 2030 provides a basic canvas rendering capability to render data. FIG. 21 is a schematic diagram of an implementation method for an underlying rendering engine. As shown in FIG. 21, a shape, an animation, and a group are rendered through a canvas interface, and components obtained through rendering are sent to a browser.

The following describes apparatus embodiments of the present disclosure, which may be used for performing the video interaction method. For details not disclosed in the apparatus embodiments of the present disclosure, reference may be made to the embodiments of the video interaction method.

Figure 22:
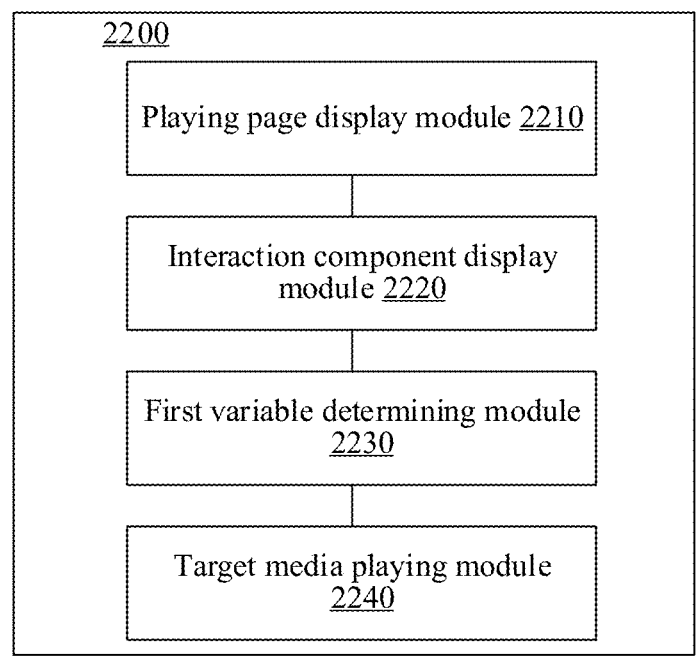
FIG. 22 is a schematic block diagram of a video interaction apparatus according to an embodiment of the present disclosure.

FIG. 22 is a schematic block diagram of a video interaction apparatus according to an embodiment of the present disclosure.

As shown in FIG. 22, a video interaction apparatus 2200 may include a playing page display module 2210, an interaction component display module 2220, a first variable determining module 2230, and a target media playing module 2240.

The playing page display module 2210 is configured to display an interactive video playing page playing a target interactive video.

The interaction component display module 2220 is configured to play a first target object in the target interactive video in the interactive video playing page, and display a first interaction component in a first region associated with the first target object.

The first variable determining module 2230 is configured to determine, in response to a first operation on the first interaction component, a first sub-variable value of a first sub-variable corresponding to the first interaction component.

The target media playing module 2240 is configured to play a target media segment of the target interactive video in the interactive video playing page according to the first sub-variable value.

According to the video interaction apparatus provided in the implementations of the present disclosure, when the target interactive video is played, the first interaction component is displayed in the first associated region when the first target object is played, and the first sub-variable value of the first sub-variable is determined based on the first operation on the first interaction component, so that the first operation and the first sub-variable can be associated. On one hand, the first sub-variable value of the first sub-variable is used as a determining condition, so that the target media segment in the interactive video can be interacted and played in response to the first operation, thereby enriching the interactivity and interactive content of the target interactive video. On the other hand, playing of the target media segment may be quickly triggered through the first operation on the first interaction component in the first region associated with the first target object, so that a response speed of a computer can be improved, the communication efficiency with the computer can be improved, and unnecessary resource wastes can be avoided.

In an exemplary embodiment, the target media playing module 2240 may further include a second interaction component sub-module, a second sub-variable sub-module, and a target media sub-module. The second interaction component sub-module is configured to play a second target object in the target interactive video in the interactive video playing page, and display a second interaction component in a second region associated with the second target object. The second sub-variable sub-module is configured to determine, in response to a second operation on the second interaction component, a second sub-variable value of a second sub-variable corresponding to the second interaction component. The target media sub-module is configured to play the target media segment of the target interactive video in the interactive video playing page according to the first sub-variable value and the second sub-variable value.

In an exemplary embodiment, the target media playing module may further include a third interaction component sub-module, a third sub-variable sub-module, and a target media sub-module. The third interaction component sub-module is configured to play a third target object in the target interactive video in the interactive video playing page, and display a third interaction component in a third region associated with the third target object. The third sub-variable sub-module is configured to determine, in response to a third operation on the third interaction component, a third sub-variable value of a third sub-variable corresponding to the third interaction component. The target media sub-module is configured to play the target media segment of the target interactive video in the interactive video playing page according to at least one of the first sub-variable value, the second sub-variable value, or the third sub-variable value.

In an exemplary embodiment, the target media segment includes at least one of a first target media segment, a second target media segment, a third target media segment, or a fourth target media segment; and the target media sub-module may include at least one of the following units: a first target media unit, a second target media unit, a third target media unit, or a fourth target media unit. The first target media unit is configured to play, according to a first determining condition set, the first sub-variable value, and the second sub-variable value, the first target media segment corresponding to the first determining condition set in the interactive video playing page. The second target media unit is configured to play, according to a second determining condition set, the second sub-variable value, and the third sub-variable value, the second target media segment corresponding to the second determining condition set in the interactive video playing page. The third target media unit is configured to play, according to a third determining condition set, the first sub-variable value, and the third sub-variable value, the third target media segment corresponding to the third determining condition set in the interactive video playing page. The fourth target media unit is configured to play, according to a fourth determining condition set, the first sub-variable value, the second sub-variable value, and the third sub-variable value, the fourth target media segment corresponding to the fourth determining condition set in the interactive video playing page.

In an exemplary embodiment, the first variable determining module 2230 may include a first change determining unit and a first variable determining unit. The first change determining unit is configured to obtain, based on the first operation, a value changing amount of the first sub-variable and a current variable value of the first sub-variable. The first variable determining unit is configured to determine the first sub-variable value according to the value changing amount of the first sub-variable and the current variable value of the first sub-variable.

In an exemplary embodiment, the video interaction apparatus 2200 may further include a global component display module and a collected object display module. The global component display module is configured to display a global component in response to a fourth operation on the interactive video playing page. The collected object display module is configured to display a collected object set including the first target object in the global component.

In an exemplary embodiment, the video interaction apparatus 2200 may further include a playing node module, a second variable current value module, a second change module, a second variable value determining module, and a fifth media playing module. The playing node module is configured to obtain a current playing node at which the target interactive video is played. The second variable current value module is configured to determine a current variable value of a second variable according to the current playing node. The second change module is configured to determine a value changing amount of the second variable in response to an update operation on the current playing node of the target interactive video. The second variable value determining module is configured to determine a second variable value of the second variable according to the value changing amount of the second variable and the current variable value of the second variable. The fifth media playing module is configured to play a fifth media segment of the target interactive video in the interactive video playing page according to the second variable value.

In an exemplary embodiment, the video interaction apparatus 2200 may further include a user set obtaining module, a user number determining module, a third variable determining module, and a sixth media playing module. The user set obtaining module is configured to obtain a preset user set of the target interactive video. The user number determining module is configured to determine a number of users triggering the first operation in response to the first interaction component in the preset user set. The third variable determining module is configured to determine a third variable value of a third variable corresponding to the first interaction component according to the number of users. The sixth media playing module is configured to play a sixth media segment of the target interactive video in the interactive video playing page when the third variable value is greater than a third variable threshold.

Figure 23:
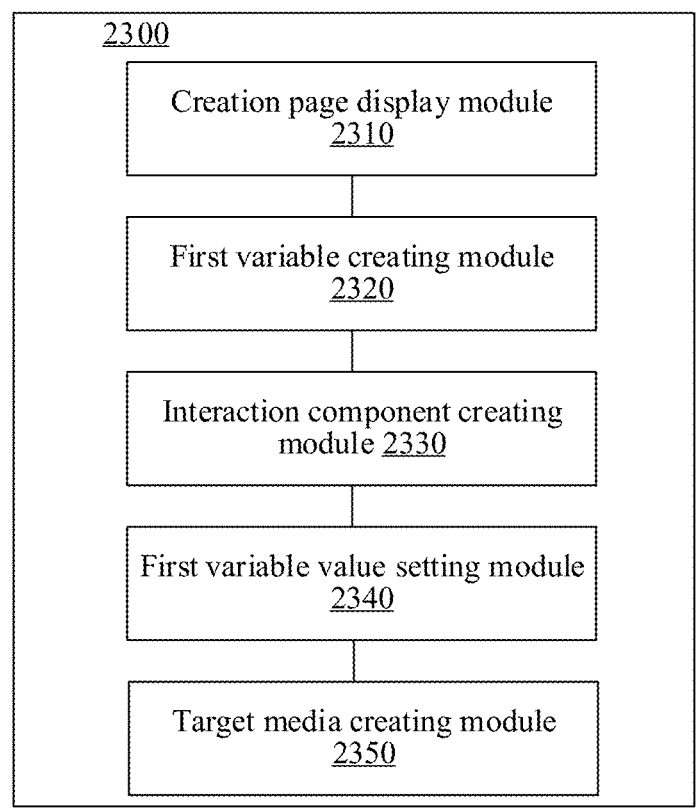
FIG. 23 is a schematic block diagram of a video interaction apparatus according to an embodiment of the present disclosure.

FIG. 23 is a schematic block diagram of a video interaction apparatus according to an embodiment of the present disclosure.

As shown in FIG. 23, a video interaction apparatus 2300 in an embodiment of the present disclosure may include a creation page display module 2310, a first variable creating module 2320, an interaction component creating module 2330, a first variable value setting module 2340, and a target media creating module 2350.

The creation page display module 2310 is configured to display an interactive video creation page, the interactive video creation page being used for creating components and media segments in an interactive video.

The first variable creating module 2320 is configured to create a first sub-variable in response to a first variable setting instruction.

The interaction component creating module 2330 is configured to create a first interaction component in a first region associated with a first target object in a target interactive video in response to a first interaction component setting instruction.

The first variable value setting module 2340 is configured to determine a first sub-variable corresponding to the first interaction component and a value changing amount of the first sub-variable according to the first interaction component setting instruction.

The target media creating module 2350 is configured to create a target media segment and a determining condition set corresponding to the target media segment in response to a target media segment setting instruction, the determining condition set corresponding to the target media segment including a determining condition corresponding to the first sub-variable, the target media segment being played based on a first sub-variable value of the first sub-variable and the determining condition set corresponding to the target media segment, and the first sub-variable value being determined based on a first operation acting on the first interaction component.

According to the video interaction apparatus provided in this embodiment of the present disclosure, the first variable setting instruction, the first interaction component setting instruction, and the target media segment setting instruction are responded, so that association among the first sub-variable, the first target object, the first associated region, the first interaction component, and the target media segment may be implemented. The generated interactive video can trigger interaction and playing of the target media segment by responding to the first operation on the first associated region, to enrich the interactivity and interactive content of the target interactive video.

In an exemplary embodiment, the video interaction apparatus 2300 may further include a global component creating module, configured to create, in response to a global component setting command, a global component and a collected object set corresponding to the global component and including the first target object.

In an exemplary embodiment, the video interaction apparatus 2300 may further include a second variable creating module and a second variable value giving module. The second variable creating module is configured to create a second variable in response to a second variable setting instruction. The second variable value giving module is configured to set a second variable value of the second variable according to a playing node of the target interactive video.

In an exemplary embodiment, the video interaction apparatus 2300 may further include a third variable creating module and a sixth media setting module. The third variable creating module is configured to create a third variable in response to a third variable setting instruction. The sixth media setting module is configured to create a sixth media segment and a determining condition set corresponding to the sixth media segment in response to a sixth media segment setting instruction, where the determining condition set corresponding to the sixth media segment includes a determining condition corresponding to the third variable.

Figure 24:
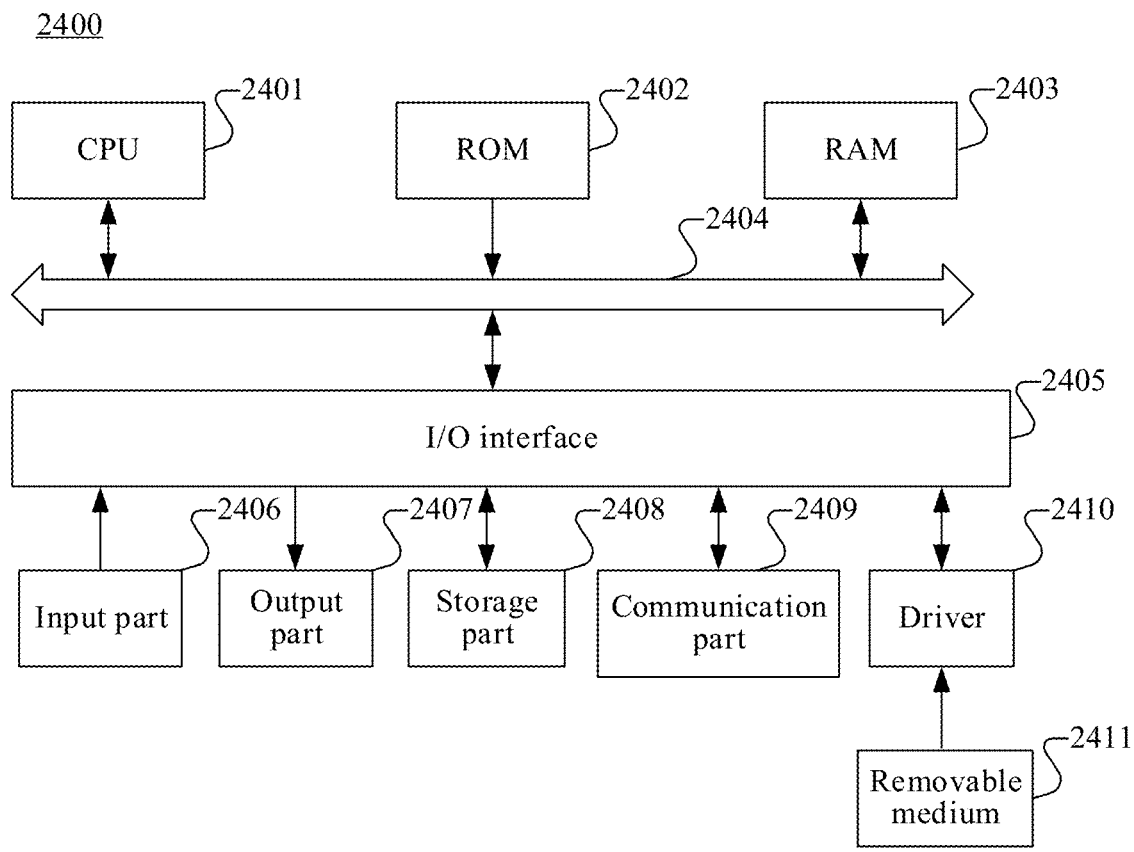
FIG. 24 is a schematic structural diagram of a computer system adapted to implement an electronic device according to an embodiment of the present disclosure.

FIG. 24 is a schematic structural diagram of a computer system adapted to implement an electronic device according to an embodiment of the present disclosure. The computer system 2400 of the electronic device shown in FIG. 24 is merely an example, and does not constitute any limitation on functions and use ranges of the embodiments of the present disclosure.

As shown in FIG. 24, the computer system 2400 includes a central processing unit (CPU) 2401, which can perform various appropriate actions and processing according to a program stored in a read-only memory (ROM) 2402 or a program loaded into a random access memory (RAM) 2403 from a storage part 2408. The RAM 2403 further stores various programs and data required for system operations. The CPU 2401, the ROM 2402, and the RAM 2403 are connected to each other through a bus 2404. An input/output (I/O) interface 2405 is also connected to the bus 2404.

The following components is connected to the I/O interface 2405: an input part 2406 including a keyboard and a mouse; an output part 2407 including a cathode ray tube (CRT), a liquid crystal display (LCD), and a speaker; a storage part 2408 including a hard disk; and a communication part 2409 including a network interface card such as an LAN card or a modem. The communication part 2409 performs communication processing through a network such as the Internet. A driver 2410 is also connected to the I/O interface 2405 as required. A removable medium 2411, such as a magnetic disk, an optical disc, a magneto-optical disk, or a semiconductor memory, is installed on the drive 2410 as required, so that a computer program read from the removable medium is installed into the storage part 2408 as required.

Particularly, according to the embodiments of the present disclosure, the processes described in the following by referring to the flowcharts may be implemented as computer-readable instructions. For example, an embodiment of the present disclosure includes a computer program product, the computer program product includes computer-readable instructions carried on a computer-readable storage medium, and the computer-readable instructions include program code used for performing the methods shown in the flowcharts. In such an embodiment, the computer-readable instructions may be downloaded and installed from the network through the communication part 2409, and/or installed from the removable medium 2411. When the computer-readable instructions are executed by the CPU 2401, the various functions defined in the system of the present disclosure are executed.

The computer-readable storage medium according to the present disclosure may be a computer-readable signal medium or a computer-readable storage medium or any combination of the two media. The computer-readable storage medium may be, for example, but is not limited to, an electrical, magnetic, optical, electromagnetic, infrared, or semiconductor system, apparatus, or device, or any combination thereof. A more specific example of the computer-readable storage medium may include but is not limited to: an electrical connection having at least one wire, a portable computer magnetic disk, a hard disk, a RAM, a ROM, an erasable programmable read-only memory (EPROM or a flash memory), an optical fiber, a compact disk read-only memory (CD-ROM), an optical storage device, a magnetic storage device, or any appropriate combination thereof. In the present disclosure, the computer-readable storage medium may be any tangible medium containing or storing a program, and the program may be used by or used in combination with an instruction execution system, apparatus, or device. In the present disclosure, the computer-readable signal medium may include a data signal being in a baseband or propagated as a part of a carrier wave, the data signal carrying computer-readable program code. The propagated data signal may be in a plurality of forms, including but not limited to, an electromagnetic signal, an optical signal, or any appropriate combination thereof. The computer-readable signal medium may alternatively be any computer-readable medium other than the computer-readable storage medium. The computer-readable medium may send, propagate, or transmit a program used by or in combination with an instruction execution system, apparatus, or device. The program code contained in the computer-readable storage medium may be transmitted by using any appropriate medium, including but not limited to: a wireless medium, a wire, an optical cable, RF, or any suitable combination thereof.

The flowcharts and block diagrams in the accompanying drawings illustrate possible system architectures, functions, and operations that may be implemented by a system, a method, and a computer program product according to various embodiments of the present disclosure. In this regard, each box in a flowchart or a block diagram may represent a module, a program segment, or a part of code. The module, the program segment, or the part of code includes at least one executable instruction used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

A related module and/or submodule and/or unit described in the embodiments of the present disclosure may be implemented in a software manner, or may be implemented in a hardware manner, and the described module and/or submodule and/or unit can also be set in a processor. Names of the modules and/or sub-modules and/or units do not constitute a limitation to the modules and/or sub-modules and/or units in a specific case.

In another aspect, the present disclosure further provides a computer-readable storage medium. The computer-readable storage medium may be included in the electronic device described in the foregoing embodiments, or may exist alone without being assembled into the electronic device. The computer-readable storage medium carries one or more computer-readable instructions, the one or more computer-readable instructions, when executed by the electronic device, causing the electronic device to implement the method described in the following embodiments. For example, the electronic device may implement steps shown in FIG. 2, FIG. 3, FIG. 4, FIG. 5, FIG. 6, FIG. 7, FIG. 8, FIG. 9, FIG. 10, or FIG. 11.

Although several modules or sub-modules or units of a device for action execution are mentioned in the foregoing detailed descriptions, the division is not mandatory. In fact, according to the implementations of the present disclosure, features and functions of two or more modules or sub-modules or units described above may be specified in one module or sub-module or unit. Conversely, the features or functions of one module or sub-module or unit or subunit described above may further be divided and embodied by a plurality of modules or sub-modules or units or subunits.

Through descriptions of the foregoing implementations, it is easy for a person skilled in the art to understand that the exemplary implementations described herein can be implemented by software or by combining software with necessary hardware. Therefore, the technical solutions of the implementations of the present disclosure may be implemented in a form of a software product. The software product may be stored in a non-volatile storage medium (which may be a CD-ROM, a USB flash drive, or a removable hard disk) or on a network, including several instructions for instructing a computing device (which may be a personal computer, a server, a touch terminal, or a network device) to perform the methods according to the implementations of the present disclosure.

In an embodiment, a computer device is further provided, including a memory and one or more processors, the memory storing computer-readable instructions, the one or more processors, when executing the computer-readable instructions, implementing the steps in the foregoing method embodiments.

In an embodiment, one or more non-volatile computer-readable storage media storing computer-readable instructions are provided, the computer-readable instructions, when executed by one or more processors, implementing the steps in the foregoing method embodiments.

In an embodiment, a computer program product or a computer program is provided, the computer program product or the computer program including computer-readable instructions, the computer-readable instructions being stored in a computer-readable storage medium, a processor of a computer device reading the computer-readable instructions from the computer-readable storage medium, and the processor executing the computer-readable instructions to cause the computer device to perform the steps in the foregoing method embodiments.

After considering this specification and practicing the present invention, a person skilled in the art may easily conceive of other implementations of the present disclosure. The present disclosure is intended to cover any variations, uses, or adaptive changes of the present disclosure. Such variations, uses, or adaptive changes follow the general principles of the present disclosure, and include well-known knowledge and technical means in the art that are not disclosed in the present disclosure. This specification and the embodiments are considered as merely exemplary, and the real scope and spirit of the present disclosure are pointed out in the following claims.

It is to be understood that the present disclosure is not limited to the precise structures described above and shown in the accompanying drawings, and various modifications and changes can be made without departing from the scope of the present disclosure. The scope of the present disclosure is subject only to the appended claims.

What is claimed is:

1. A video interaction method, performed by an electronic device, the method comprising:
    displaying an interactive video creation page, the interactive video creation page being used for creating components and media segments in an interactive video;
    displaying, on the interactive video creation page, a material display part and a value setting part simultaneously, the material display part indicating materials used in the interactive video and a node position relationship among the materials, the value setting part being an interface diagram for configuring settings of a plurality of sub-variables;
    creating a first sub-variable in response to a first variable setting instruction received at the value setting region, the first variable setting instruction including a variable name and an initial value of the first sub-variable;
    creating a first interaction component in a first region associated with a first target object in a target interactive video in response to a first interaction component setting instruction;
    determining a first sub-variable corresponding to the first interaction component and a value changing amount of the first sub-variable according to the first interaction component setting instruction, the first interaction component setting instruction including setting a position of the first region and an occurrence period of the first interaction component; and
    creating a target media segment and a determining condition set corresponding to the target media segment in response to a target media segment setting instruction, the determining condition set corresponding to the target media segment comprising a determining condition corresponding to the first sub-variable, the target media segment being played based on a first sub-variable value of the first sub-variable and the determining condition set corresponding to the target media segment, and the first sub-variable value being determined based on a first operation acting on the first interaction component by calculating a mathematical sum of the value changing amount of the first sub-variable and a current variable value of the first sub-variable.

2. The method according to claim 1, further comprising:
    creating, in response to a global component setting command, a global component and a collected object set corresponding to the global component and comprising the first target object.

3. The method according to claim 1, further comprising:
    creating a second variable in response to a second variable setting instruction; and
    setting a second variable value of the second variable according to a playing node of the target interactive video.

4. The method according to claim 1, further comprising:
    creating a third variable in response to a third variable setting instruction; and
    creating a sixth media segment and a determining condition set corresponding to the sixth media segment in response to a sixth media segment setting instruction, wherein the determining condition set corresponding to the sixth media segment comprises a determining condition corresponding to the third variable.

5. The method according to claim 1, wherein the value setting part of the interactive video creation page comprises input boxes for entering the first variable setting instruction and a control for adding a new sub-variable, the input boxes are simultaneously displayed with the material display part.

6. One or more non-transitory computer-readable storage media storing computer-readable instructions, the computer-readable instructions, when executed by one or more processors, causing the one or more processors to perform:
displaying an interactive video creation page, the interactive video creation page being used for creating components and media segments in an interactive video;
displaying, on the interactive video creation page, a material display part and a value setting part simultaneously, the material display part indicating materials used in the interactive video and a node position relationship among the materials, the value setting part being an interface diagram for configuring settings of a plurality of sub-variables;
creating a first sub-variable in response to a first variable setting instruction received at the value setting region, the first variable setting instruction including a variable name and an initial value of the first sub-variable;
creating a first interaction component in a first region associated with a first target object in a target interactive video in response to a first interaction component setting instruction;
determining a first sub-variable corresponding to the first interaction component and a value changing amount of the first sub-variable according to the first interaction component setting instruction, the first interaction component setting instruction including setting a position of the first region and an occurrence period of the first interaction component; and
creating a target media segment and a determining condition set corresponding to the target media segment in response to a target media segment setting instruction, the determining condition set corresponding to the target media segment comprising a determining condition corresponding to the first sub-variable, the target media segment being played based on a first sub-variable value of the first sub-variable and the determining condition set corresponding to the target media segment, and the first sub-variable value being determined based on a first operation acting on the first interaction component by calculating a mathematical sum of the value changing amount of the first sub-variable and a current variable value of the first sub-variable.

7. The storage media according to claim 6, wherein the computer-readable instructions further cause the one or more processors to perform:
creating, in response to a global component setting command, a global component and a collected object set corresponding to the global component and comprising the first target object.

8. The storage media according to claim 6, wherein the computer-readable instructions further cause the one or more processors to perform:
creating a second variable in response to a second variable setting instruction; and
setting a second variable value of the second variable according to a playing node of the target interactive video.

9. The storage media according to claim 6, wherein the computer-readable instructions further cause the one or more processors to perform:
creating a third variable in response to a third variable setting instruction; and
creating a sixth media segment and a determining condition set corresponding to the sixth media segment in response to a sixth media segment setting instruction, wherein the determining condition set corresponding to the sixth media segment comprises a determining condition corresponding to the third variable.

10. A video interaction apparatus, comprising: a memory and one or more processors, the memory storing computer-readable instructions, the computer-readable instructions, when executed by the one or more processors, causing the one or more processors to implement:
displaying an interactive video creation page, the interactive video creation page being used for creating components and media segments in an interactive video;
displaying, on the interactive video creation page, a material display part and a value setting part simultaneously, the material display part indicating materials used in the interactive video and a node position relationship among the materials, the value setting part being an interface diagram for configuring settings of a plurality of sub-variables;
creating a first sub-variable in response to a first variable setting instruction received at the value setting region, the first variable setting instruction including a variable name and an initial value of the first sub-variable;
creating a first interaction component in a first region associated with a first target object in a target interactive video in response to a first interaction component setting instruction;
determining a first sub-variable corresponding to the first interaction component and a value changing amount of the first sub-variable according to the first interaction component setting instruction, the first interaction component setting instruction including setting a position of the first region and an occurrence period of the first interaction component; and
creating a target media segment and a determining condition set corresponding to the target media segment in response to a target media segment setting instruction, the determining condition set corresponding to the target media segment comprising a determining condition corresponding to the first sub-variable, the target media segment being played based on a first sub-variable value of the first sub-variable and the determining condition set corresponding to the target media segment, and the first sub-variable value being determined based on a first operation acting on the first interaction component by calculating a mathematical sum of the value changing amount of the first sub-variable and a current variable value of the first sub-variable.

11. The apparatus according to claim 10, wherein the computer-readable instructions further cause the one or more processors to implement:
creating, in response to a global component setting command, a global component and a collected object set corresponding to the global component and comprising the first target object.

12. The apparatus according to claim 10, wherein the computer-readable instructions further cause the one or more processors to implement:

creating a second variable in response to a second variable setting instruction; and setting a second variable value of the second variable according to a playing node of the target interactive video.

13. The apparatus according to claim 10, wherein the computer-readable instructions further cause the one or more processors to implement:

creating a third variable in response to a third variable setting instruction; and creating a sixth media segment and a determining condition set corresponding to the sixth media segment in response to a sixth media segment setting instruction, wherein the determining condition set corresponding to the sixth media segment comprises a determining condition corresponding to the third variable.

14. The apparatus according to claim 10, wherein the value setting part of the interactive video creation page comprises input boxes for entering the first variable setting instruction and a control for adding a new sub-variable, the input boxes are simultaneously displayed with the material display part.

* * * * *